(12) United States Patent
Kim et al.

(10) Patent No.: US 12,145,425 B2
(45) Date of Patent: Nov. 19, 2024

(54) HEAT PUMP SYSTEM FOR VEHICLE

(71) Applicants: Hyundai Motor Company, Seoul (KR); Kia Corporation, Seoul (KR)

(72) Inventors: Jeawan Kim, Hwaseong-si (KR); Hochan An, Hwaseong-si (KR); Wan Je Cho, Hwaseong-si (KR); Hoyoung Jeong, Daegu (KR); Man Hee Park, Suwon-si (KR); Yeong Jun Kim, Incheon (KR); Jae Yeon Kim, Hwaseong-si (KR); Yeonho Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 208 days.

(21) Appl. No.: 18/061,201

(22) Filed: Dec. 2, 2022

(65) Prior Publication Data
US 2024/0010046 A1    Jan. 11, 2024

(30) Foreign Application Priority Data
Jul. 5, 2022   (KR) .................... 10-2022-0082313

(51) Int. Cl.
*B60H 1/00* (2006.01)
(52) U.S. Cl.
CPC ..... *B60H 1/00921* (2013.01); *B60H 1/00278* (2013.01); *B60H 2001/00307* (2013.01); *B60H 2001/00928* (2013.01); *B60H 2001/00949* (2013.01)

(58) Field of Classification Search
CPC ............ B60H 1/00921; B60H 1/32284; B60H 1/00278; B60H 2001/00307; B60H 2001/00928; F25B 2400/23; F25B 41/385
See application file for complete search history.

(56) References Cited

U.S. PATENT DOCUMENTS

| | | | |
|---|---|---|---|
| 10,661,631 B2 | 5/2020 | Kawano | |
| 11,235,262 B2 | 2/2022 | Osaki et al. | |
| 2013/0312447 A1 | 11/2013 | Inaba et al. | |

(Continued)

FOREIGN PATENT DOCUMENTS

| | | |
|---|---|---|
| JP | 2013203221 A | 10/2013 |
| KR | 101558314 B1 | 10/2015 |

(Continued)

*Primary Examiner* — David J Teitelbaum
(74) *Attorney, Agent, or Firm* — Slater Matsil, LLP

(57) ABSTRACT

An embodiment heat pump system for a vehicle includes a cooling apparatus including a radiator and a multi-way valve connected by a first coolant line and configured to circulate a coolant in the first coolant line, a second coolant line including first and second ends connected to the multi-way valve and equipped with a first water pump and an electrical component, a third coolant line including first and second ends connected to the multi-way valve and equipped with a second water pump and a battery module, a chiller provided on the third coolant line, connected to a refrigerant line of an air conditioner device through a refrigerant connection line, and configured to adjust a temperature of the coolant circulated in the third coolant line, and a gas injection device configured to selectively expand a refrigerant and to selectively supply some of the refrigerant to a compressor.

20 Claims, 7 Drawing Sheets

(56) References Cited

U.S. PATENT DOCUMENTS

| | | | | |
|---|---|---|---|---|
| 2016/0339767 | A1* | 11/2016 | Enomoto | B60H 1/00864 |
| 2018/0281562 | A1* | 10/2018 | Spies | F25B 25/005 |
| 2020/0047583 | A1* | 2/2020 | Ishizeki | H01M 10/635 |
| 2020/0180391 | A1* | 6/2020 | Kim | B60H 1/3223 |
| 2020/0369108 | A1* | 11/2020 | Kim | B60H 1/00921 |
| 2022/0032725 | A1* | 2/2022 | Miyakoshi | H01M 10/615 |

FOREIGN PATENT DOCUMENTS

| | | |
|---|---|---|
| KR | 20200040432 A | 4/2020 |
| KR | 20210126361 A | 10/2021 |

\* cited by examiner

HEAT PUMP SYSTEM FOR VEHICLE

CROSS-REFERENCE TO RELATED APPLICATIONS

This application claims the benefit of Korean Patent Application No. 10-2022-0082313, filed on Jul. 5, 2022, which application is hereby incorporated herein by reference.

TECHNICAL FIELD

The present invention relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since the battery cooling system warming or cooling the battery according to a state of the vehicle is separately provided so that the battery exhibits optimal performance, a plurality of valves for connecting the respective connection pipes to each other are used, and noise and vibration due to frequent opening or closing operations of these valves are transferred to the interior of the vehicle, such that ride comfort is deteriorated.

In addition, when heating the interior of the vehicle, there are disadvantages of decreasing heating performance due to a lack of a heat source, increasing electricity consumption due to the use of an electric heater, increasing power consumption of the compressor, and the like.

The above information disclosed in this background section is only for enhancement of understanding of the background of embodiments of the invention, and therefore it may contain information that does not form the prior art that is already known to a person of ordinary skill in the art.

SUMMARY

The present invention relates to a heat pump system for a vehicle. Particular embodiments relate to a heat pump system for a vehicle for controlling a temperature of a battery module by using a chiller in which a refrigerant and a coolant are heat-exchanged and for improving heating performance and efficiency by using waste heat generated from an external heat source and an electrical component.

Embodiments of the present invention provide a heat pump system for a vehicle capable of improving heating performance and efficiency by using one chiller in which a coolant and a refrigerant exchange heat with each other to regulate a temperature of a battery module and selectively recovering waste heat generated from an external heat source and an electrical component to be used for indoor heating.

In addition, embodiments of the present invention provide a heat pump system for a vehicle capable of maximizing the heating performance by increasing a flow rate of the refrigerant by applying a gas injection device that selectively operates in a heating mode of the vehicle.

A heat pump system for a vehicle according to an embodiment of the present invention includes a cooling apparatus including a radiator and a multi-way valve connected by a first coolant line and circulating a coolant in the first coolant line, a second coolant line including one end and the other end connected to the multi-way valve and equipped with a first water pump and an electrical component, a third coolant line including one end and the other end connected to the multi-way valve and equipped with a second water pump and a battery module, a chiller provided on the third coolant line, connected to the refrigerant line of the air conditioner device through a refrigerant connection line, and adjusting a temperature of a coolant circulated in the third coolant line by heat-exchanging the coolant selectively inflowing through the third coolant line with the refrigerant selectively supplied from the air conditioner device, and a gas injection device selectively expanding the refrigerant supplied from the internal condenser included in the air conditioner device to be supplied to the heat-exchanger and selectively supplying some of the refrigerant supplied from the internal condenser to the compressor to increase a flow rate of the refrigerant circulating the refrigerant line, wherein the heat-exchanger is connected to the second coolant line. The gas injection device includes a gas-liquid separator that separates the refrigerant inflowing inside into a gas refrigerant and a liquid refrigerant to be selectively exhausted, a supply unit connected to the internal condenser through the refrigerant line so that the refrigerant supplied from the internal condenser inflows, a first expansion valve provided between the gas-liquid separator and the supply unit to selectively expand the refrigerant supplied to the supply unit to be supplied to the gas-liquid separator, a second expansion valve selectively expanding the refrigerant supplied to the supply unit to be supplied to the heat-exchanger and provided between the gas-liquid separator and the supply unit so as to supply the refrigerant supplied from the gas-liquid separator to be supplied to the heat-exchanger, and a supply line connecting the gas-liquid separator and the compressor and selectively supplying the refrigerant in a gas state from the gas-liquid separator to the compressor.

The air conditioner device may include an HVAC module including an evaporator connected through the refrigerant line and an opening/closing door controlling the outside air passing through the evaporator to selectively inflow to the internal condenser according to a cooling, heating, and dehumidification mode of the vehicle, the compressor connected via the refrigerant line between the evaporator and the internal condenser, a sub-condenser provided in the refrigerant line between the heat-exchanger and the evaporator, a third expansion valve provided in the refrigerant line between the sub-condenser and the evaporator, a fourth expansion valve provided in the refrigerant connection line, and an accumulator provided in the refrigerant line between the evaporator and the compressor and connected to the refrigerant connection line.

When the gas injection device is operated in a heating mode of the vehicle, the first expansion valve may expand the refrigerant supplied through the supply unit from the internal condenser to be supplied to the gas-liquid separator, the second expansion valve may expand the refrigerant supplied from the gas-liquid separator to flow to the refrigerant line, the supply line may be opened, and the gas-liquid separator may supply the refrigerant in the gas state to the compressor through the open supply line among the refrigerant inflowed inside.

When the gas injection device does not operate in the vehicle's heating mode, the operation of the first expansion valve may be stopped, the inflow of the refrigerant to the gas-liquid separator may be blocked, and the second expansion valve may expand the refrigerant supplied from the internal condenser through the supply unit to be supplied to the heat-exchanger.

In a case of the cooling mode or dehumidification mode of the vehicle, in the gas injection device, the operation of the first expansion valve may be stopped, the second expansion valve may flow the refrigerant supplied from the internal condenser through the supply unit through the refrigerant line without an expansion, and the refrigerant inflow to the gas-liquid separator may be blocked.

The heat-exchanger may additionally condense or evaporate the refrigerant condensed in the internal condenser through heat-exchange with the coolant according to the selective operation of the gas injection device.

The fourth expansion valve, when cooling the battery module by using the coolant heat-exchanged with the refrigerant, may expand the refrigerant inflowing through the refrigerant connection line to inflow to the chiller.

The air conditioner device may further include a first branched line including one end connected to the fourth expansion valve and the other end connected to the refrigerant line provided between the evaporator and the accumulator, a second branched line directly inflowing the refrigerant exhausted from the heat-exchanger through the operation of the refrigerant valve provided on the refrigerant line between the heat-exchanger and the sub-condenser to the accumulator, a third branched line including one end connected to the refrigerant line between the heat-exchanger and the gas injection device and the other end connected to the control valve, a dehumidification line including one end connected to the control valve and the other end connected to the refrigerant line between the evaporator and the third expansion valve, and a sub-supply line including one end connected to the control valve and the other end connected to the refrigerant line between the heat-exchanger and the sub-condenser.

The first branched line may be selectively opened and closed through the operation of the fourth expansion valve in the vehicle's heating mode, the second branched line may be opened by the operation of the refrigerant valve in the vehicle's heating mode, the third branched line may be selectively opened and closed through the operation of the control valve in the heating mode and dehumidification mode of the vehicle, the dehumidification line may be opened through the operation of the control valve in the heating and dehumidification mode of the vehicle, and the sub-supply line may be selectively opened through the operation of the control valve in the heating mode of the vehicle.

When cooling the battery module in the cooling mode, the first coolant line may be connected to the second coolant line through the operation of the multi-way valve, the coolant cooled by the radiator may circulate through the electrical component while flowing along the first coolant line and the second coolant line through the operation of the first water pump, the third coolant line may form a closed and sealed circuit independent from the first and second coolant lines through the operation of the multi-way valve, and the coolant that has passed through the chiller may be supplied to the battery module through the operation of the second water pump in the third coolant line. In the air conditioner device, in a state that the first branched line is closed and the refrigerant connection line is opened through the operation of the fourth expansion valve, the refrigerant may circulate along the refrigerant line and the refrigerant connection line, the third and fourth expansion valves may expand the refrigerant so that the expanded refrigerant is supplied to the evaporator and the chiller, respectively, the second branched line may be closed through the operation of the refrigerant valve, and the third branched line, the sub-supply line, and the dehumidification line may be closed through the operation of the control valve. In the gas injection device, the second expansion valve may supply the refrigerant supplied from the internal condenser to the heat-exchanger without expanding.

In the cooling apparatus, the coolant cooled by the radiator may be supplied to the heat-exchanger along the first coolant line and the second coolant line through the operation of the first water pump, in a state that one end and the other end of the third coolant line are interconnected through the multi-way valve, the coolant may continually circulate while sequentially passing through the battery module and the chiller along the third coolant line through the operation of the second water pump, and the heat-exchanger may condense the refrigerant through heat-exchange with the coolant.

When recovering the heat from an external heat source and the waste heat of the electrical component in the vehicle's heating mode, the first coolant line may be connected to the second coolant line through the operation of the multi-way valve, the coolant cooled by the radiator may circulate through the electrical component while flowing along the first coolant line and the second coolant line through the operation of the first water pump, and the third coolant line may be closed through the operation of the multi-way valve. In the air conditioner device, a portion of the refrigerant line that connects the sub-condenser and the evaporator may be closed through the operation of the third expansion valve, the first branched line may be opened through the operation of the fourth expansion valve, in a state where some of the refrigerant connection lines are opened through the operation of the fourth expansion valve so that the refrigerant line connected to the sub-condenser is connected to the refrigerant connection line, a portion of the refrigerant connection line connected to the chiller may be closed based on the fourth expansion valve, the second branched line may be opened through the operation of the refrigerant valve, the third branched line and the sub-supply line may be opened through the operation of the control valve, and the refrigerant that inflows into the sub-supply line may be supplied along the refrigerant line to the sub-condenser. In the gas injection device, the operation of the first expansion valve and the gas-liquid separator may be stopped, the second expansion valve may expand the refrigerant supplied from the internal condenser to be supplied to the heat-exchanger connected through the refrigerant line, and the heat-exchanger may recover the heat from an external heat source and the waste heat of the electrical component while evaporating the refrigerant supplied through the second expansion valve through heat-exchange with the coolant recovering the heat from an external heat source and having a temperature that is increased while cooling the electrical component.

When the gas injection device operates while recovering the heat from an external heat source and the waste heat of the electrical component in the vehicle's heating mode, the first coolant line may be connected to the second coolant line through the operation of the multi-way valve, the coolant cooled by the radiator may circulate through the electrical component while flowing along the first coolant line and the second coolant line through the operation of the first water pump, and the third coolant line may be closed through the operation of the multi-way valve. In the air conditioner device, a portion of the refrigerant line connecting the sub-condenser and the evaporator may be closed through the operation of the third expansion valve, in a state where a portion of the refrigerant connection line is opened through the operation of the fourth expansion valve so that the refrigerant line connected to the sub-condenser is connected to the refrigerant connection line, a portion of the refrigerant connection line connected to the chiller may be closed based on the fourth expansion valve, the second branched line may be opened through the operation of the refrigerant valve, the third branched line and the sub-supply line may be opened through the operation of the control valve, and the refrigerant that may inflow into the sub-supply line is supplied along the refrigerant line to the sub-condenser. In the gas injection device, the first expansion valve may expand the refrigerant supplied from the supply unit to be supplied to the gas-liquid separator, the gas-liquid separator may supply the refrigerant in a gas state to the compressor through the opened supply line among the refrigerant supplied from the first expansion valve, the second expansion valve may additionally expand the refrigerant supplied from the gas-liquid separator to be supplied to the heat-exchanger connected through the refrigerant line, and the heat-exchanger may recover the heat from an external heat source and the waste heat of the electrical component while evaporating the refrigerant supplied through the second expansion valve through heat-exchange with the coolant recovering the heat from an external heat source and having a temperature increased while cooling the electrical component.

When the gas injection device operates while recovering the waste heat of the electrical component in the vehicle's heating mode, the first coolant line and the third coolant line may be closed through the operation of the multi-way valve, one end and the other end of the second coolant line may be interconnected through the operation of the multi-way valve so that the second coolant line may form an independent closed and sealed circuit, and in the second coolant line, the coolant that has passed through the electrical component may continue to circulate through the operation of the first water pump. In the air conditioner device, the refrigerant line connecting the sub-condenser and the evaporator may be closed through the operation of the third expansion valve, the refrigerant connection line and the first branched line may be closed through the operation of the fourth expansion valve, the second branched line may be opened through the operation of the refrigerant valve, and the third branched line, the sub-supply line, and the dehumidification line may be closed through the operation of the control valve. In the gas injection device, the first expansion valve may expand the refrigerant supplied from the supply unit to be supplied to the gas-liquid separator, the gas-liquid separator may supply the refrigerant in a gas state to the compressor through the opened supply line among the refrigerant supplied from the first expansion valve, the second expansion valve may additionally expand the refrigerant supplied from the gas-liquid separator to be supplied to the heat-exchanger connected through the refrigerant line, and the heat-exchanger may recover the waste heat of the electrical component while evaporating the refrigerant supplied through the second expansion valve through heat-exchange with a coolant whose temperature has risen while cooling the electrical component.

In a case of the heating and dehumidification mode of the vehicle, the first coolant line may be connected to the second coolant line through the operation of the multi-way valve, the coolant cooled by the radiator may circulate through the electrical component while flowing along the first coolant line and the second coolant line through the operation of the first water pump, and the third coolant line may be closed through the operation of the multi-way valve. In the air conditioner device, the refrigerant line connecting the sub-condenser and the evaporator may be closed through the operation of the third expansion valve, the refrigerant connection line and the first branched line may be closed through the operation of the fourth expansion valve, the second branched line may be opened through the operation of the refrigerant valve, the third branched line and the dehumidification line may be opened through the operation of the control valve, and the sub-supply line may be closed through the operation of the control valve. In the gas injection device, the operation of the first expansion valve and the gas-liquid separator may be stopped, the second expansion valve may expand the refrigerant supplied from the internal condenser to be supplied to the heat-exchanger connected through the refrigerant line, the heat-exchanger may recover the heat from an external heat source and the waste heat of the electrical component while evaporating the refrigerant supplied through the second expansion valve through heat-exchange with the coolant recovering the heat from an external heat source and having a temperature that is increased while cooling the electrical component, and the dehumidification line may supply some refrigerant from the refrigerant expanded through the operation of the second expansion valve to the evaporator.

When cooling the electrical component and the battery module by using the coolant, the first coolant line may be connected to one end of the third coolant line through the operation of the multi-way valve, the other end of the third coolant line may be connected to one end of the second coolant line through the operation of the multi-way valve, the other end of the second coolant line may be connected to the first coolant line through the operation of the multi-way valve, the coolant cooled by the radiator may be supplied to the battery module along the third coolant line from the multi-way valve through the operation of the second water pump, the coolant that has passed the battery module may inflow back to the multi-way valve along the third coolant line, and then is supplied to the electrical component along the second coolant line through the operation of the first water pump, the coolant that has passed through the electrical component may flow into the multi-way valve along the second coolant line, and then is supplied to the radiator along the first coolant line, and the operation of the air conditioner device and the gas injection device may be stopped.

The first coolant line, the second coolant line, and the third coolant line may be interconnected by the operation of the multi-way valve to form one connected circuit in which the coolant cooled by the radiator circulates.

The first expansion valve may selectively expand the refrigerant while controlling the flow of the refrigerant and may be a 2-way electronic expansion valve with one inlet and one outlet, and the second expansion valve and the fourth expansion valve may selectively expand the refrigerant while controlling the flow of the refrigerant and may be a 3-way electronic expansion valve with two inlets and one outlet.

The first water pump may be mounted on the multi-way valve to which the second coolant line is connected, and the second water pump may be mounted on the multi-way valve to which the third coolant line is connected.

The multi-way valve may be equipped with a reservoir tank that is integrally mounted.

As described above, according to the heat pump system for the vehicle according to embodiments of the present invention, simplification of the system may be realized, by using one chiller in which a refrigerant and a coolant are heat-exchanged to control a temperature of a battery module according to a vehicle mode.

In addition, according to embodiments of the present invention, by efficiently controlling a temperature of a battery module, it is possible to operate the battery module at optimal performance, and a total mileage of the vehicle may be increased through efficient management of the battery module.

In addition, embodiments of the present invention may improve heating efficiency by selectively using heat from an external heat source or waste heat of an electrical component in the vehicle's heating mode.

In addition, embodiments of the present invention may maximize heating performance by selectively increasing the flow rate of a refrigerant in the vehicle's heating mode by applying a gas injection device.

Furthermore, according to embodiments of the present invention, it is possible to reduce manufacturing cost and weight through simplification of an entire system and to improve space utilization.

Figure 1:
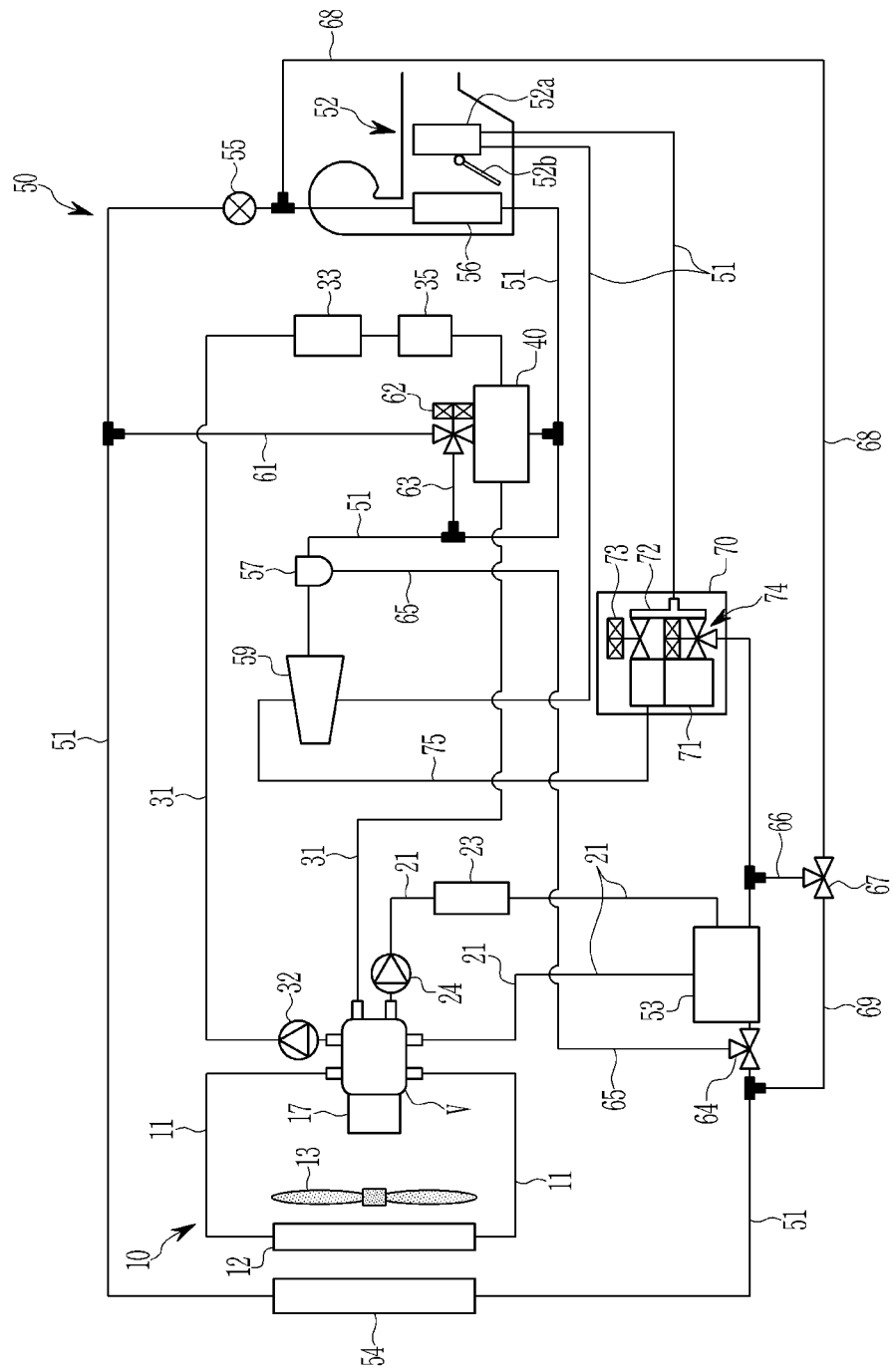
FIG. 1 is a block diagram of a heat pump system for a vehicle according to an embodiment of the present invention.

The following reference identifiers may be used in connection with the accompanying drawings to describe exemplary embodiments of the present disclosure.

10: cooling apparatus
11, 21, 31: first, second, and third coolant lines
12: radiator
13: cooling fan
17: reservoir tank
23: electrical component
24, 32: first and second water pumps
33: battery module
35: coolant heater
50: air conditioner device
51: refrigerant line
52: HVAC module
53: heat-exchanger
54: sub-condenser
55, 63: third and fourth expansion valves
56: evaporator
57: accumulator
59: compressor
61: refrigerant connection line
63, 65, 66: first, second, and third branched lines
64: refrigerant valve
67: control valve
68: dehumidification line
70: gas injection device 71: gas-liquid separator
72: supply unit
73, 74: first and second expansion valves
75: supply line
V: multi-way valve

DETAILED DESCRIPTION OF ILLUSTRATIVE EMBODIMENTS

Embodiments of the present invention will hereinafter be described in detail with reference to the accompanying drawings.

Embodiments described in the present specification and configurations shown in the drawings are just the most preferable embodiments of the present invention, but do not limit the spirit and scope of the present invention. Therefore, it should be understood that there may be various equivalents and modifications capable of replacing them.

In order to clarify embodiments of the present invention, parts that are not connected with the description will be omitted, and the same elements or equivalents are referred to by the same reference numerals throughout the specification.

The size and thickness of each element are arbitrarily shown in the drawings, but embodiments of the present invention are not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit," " . . . mechanism," " . . . portion," " . . . member," etc. used herein mean a unit of inclusive components performing at least one or more functions or operations.

FIG. 1 is a block diagram of a heat pump system for a vehicle according to an embodiment of the present invention.

A heat pump system for a vehicle according to an embodiment of the present invention controls a temperature of a battery module 33 by using a chiller 40 in which a refrigerant and a coolant are heat-exchanged, and improves heating performance and efficiency by using heat from an external heat source, or a waste heat of an electrical component 23, and a gas injection device 70.

Here, in the heat pump system, the cooling apparatus 10 for circulating the coolant to the electrical component 23 and the battery module 33 in the electric vehicle and the air conditioner device 50, which is an air conditioner for cooling and heating the room, may be interlocked.

That is, referring to FIG. 1, the heat pump system may include the cooling apparatus 10, the second coolant line 21, the third coolant line 31, the chiller 40, the air conditioner device 50, and the gas injection device 70.

First, the cooling apparatus 10 may include a radiator 12 and a multi-way valve V connected by a first coolant line 11.

The radiator 12 is disposed at the front of the vehicle, and the cooling fan 13 is provided at the rear. Accordingly, the radiator 12 may cool the coolant through the operation of the cooling fan 13 and heat-exchange with the outside air.

One end and the other end of the second coolant line 21 are connected to the multi-way valve V. The second coolant line 21 may be equipped with a first water pump 24 and the electrical component 23.

Here, the electrical component 23 may include an electric power control unit (EPCU), or a motor, or an inverter, or a charger (On Board Charger, OBC), or an autonomous driving controller.

The power control apparatus, or the inverter, or the motor, or the autonomous driving controller may heat up while driving, and the charger may heat up when charging the battery module 33.

The electrical component 23 configured in this way may be provided in the second coolant line 21 and cooled by water cooling.

That is, when the waste heat of the electrical component 23 is recovered in the heating mode of the vehicle, heat generated from the power control apparatus, the motor, the inverter, the charger, or the autonomous driving controller may be recovered.

Meanwhile, during the operation of the first water pump 24, so that the coolant is supplied to the electrical component 23 provided in the second coolant line 21, the cooling apparatus 10 may circulate the coolant from the first coolant line 11 to the second coolant line 21 connected through the multi-way valve V.

That is, the cooling apparatus 10 circulates the coolant cooled in the radiator 12 through the operation of the first water pump 24 along the first coolant line 11 and the second coolant line 21, so that the electrical component 23 is not overheated.

In the present embodiment, one end and the other end of the third coolant line 31 are connected to the multi-way valve V. The third coolant line 31 may be equipped with a second water pump 32 and the battery module 33.

Accordingly, in the third coolant line 31, the coolant cooled by the radiator 12 may flow through the selective operation of the multi-way valve V and the operation of the second water pump 32, or the coolant stored in the third coolant line 31 may be independently circulated.

That is, the third coolant line 31 may circulate the coolant to the battery module 33 through the operation of the second water pump 32.

Here, the battery module 33 supplies power to the electrical component 23 and is formed as a water cooling type that is cooled with a coolant flowing along the third coolant line 31.

That is, the battery module 33 may be selectively connected through the first coolant line 11 and the third coolant line 31 connected to the radiator 12 according to the operation of the multi-way valve V.

Meanwhile, the third coolant line 31 may be connected to the second coolant line 21 according to the operation of the multi-way valve V.

The third coolant line 31 configured in this way may circulate the coolant supplied from the radiator 12 or the coolant stored inside the third coolant line 31 to the battery module 33 through the operation of the second water pump 32.

Here, the first and second water pumps 24 and 32 may be electric water pumps.

Also, the first water pump 24 may be integrally mounted on the multi-way valve V to which the second coolant line 21 is connected. And the second water pump 32 may be integrally mounted on the multi-way valve V to which the third coolant line 31 is connected.

Meanwhile, the reservoir tank 17 may be integrally mounted to the multi-way valve V. The coolant cooled by the radiator 12 may be stored in the reservoir tank 17.

When the cooling apparatus 10 configured as above absorbs the waste heat generated from the electrical component 23 to increase the coolant temperature, the multi-way valve V may connect the first coolant line 11 and the second coolant line 21, or operate so that the second coolant line 21 forms a closed and sealed circuit independent of the first and third coolant lines 11 and 31.

In addition, when recovering the waste heat of the battery module 33, or when increasing the temperature of the battery module 33, or when cooling the battery module 33, the multi-way valve V may be operated for the third coolant line 31 to form a closed and sealed circuit independent of the first and second coolant lines 11 and 21 so that the coolant that has passed through the battery module 33 is supplied back to the battery module 33 without passing through the radiator 12.

In the present embodiment, the chiller 40 is provided in the third coolant line 31, and the coolant may optionally be circulated inside.

The chiller 40 is connected through the refrigerant line 51 of the air conditioner device 50 and the refrigerant connection line 61. That is, the chiller 40 may be a water-cooled heat-exchanger in which the coolant is inflowed.

Accordingly, the chiller 40 may heat-exchange the coolant selectively inflowed through the third coolant line 31 with the refrigerant selectively supplied from the air conditioner device 50 to control the temperature of the coolant.

Meanwhile, in the present embodiment, the multi-way valve V may control the flow of the coolant by selectively connecting or disconnecting the first coolant line 11, the second coolant line 21, and the third coolant line 31.

First, the multi-way valve V may connect the first coolant line 11 and the second coolant line 21 when cooling the electrical component 23 by using the coolant cooled by the radiator 12.

Accordingly, the coolant cooled by the radiator 12 may cool the electrical component 23 while circulating along the first coolant line 11 and the second coolant line 21 connected through the operation of the multi-way valve V.

Conversely, when recovering the waste heat from the electrical component 23, the multi-way valve V closes the first coolant line 11 connected to the radiator 12, and may be operated to form an independent closed and sealed circuit as one end and the other end of the second coolant line 21 are connected.

Then, while the coolant circulated in the second coolant line 21 passes through the electrical component 23 without passing the radiator 12, the temperature may increase.

Also, when cooling the battery module 33 by using the coolant cooled by the radiator 12, the multi-way valve V may connect the first coolant line 11 and the third coolant line 31.

Accordingly, the coolant cooled by the radiator 12 may cool the battery module 33 while flowing along the first coolant line 11 and the third coolant line 31 connected through the operation of the multi-way valve V.

Also, when cooling the battery module 33 by using the coolant heat-exchanged with the refrigerant in the chiller 40, the multi-way valve V closes the first coolant line 11 connected to the radiator 12 and may be operated to form an independent closed and sealed circuit as one end and the other end of the third coolant line 31 are connected.

Therefore, the coolant of low-temperature that the heat-exchange with the refrigerant has completed in the chiller 40 flows into the battery module 33 along the third coolant line 31, thereby efficiently cooling the battery module 33.

On the other hand, when raising the temperature of the battery module 33, the multi-way valve V prevents the coolant circulated in the third coolant line 31 from flowing into the radiator 12, so that the temperature of the battery module 33 may be quickly raised.

Here, a coolant heater 35 may be provided in the third coolant line 31 between the battery module 33 and the chiller 40.

The coolant heater 35 is operated ON to heat the coolant circulated in the third coolant line 31 when the temperature of the battery module 30 is required to be increased, and the coolant whose temperature has risen may be inflowed into the battery module 33.

This coolant heater 35 may be an electric heater that operates according to the power supply.

That is, the coolant heater 35 is operated when the temperature of the second coolant supplied to the battery module 33 is lower than the target temperature, so that the coolant circulated in the third coolant line 31 may be heated.

Accordingly, the coolant whose temperature has increased while passing through the coolant heater 35 is supplied to the battery module 33, and the temperature of the battery module 33 may be increased.

Therefore, the coolant heater 35 may be operated selectively when the temperature of the battery module 33 is raised.

In the present embodiment, the air conditioner device 50 may include an HVAC (Heating, Ventilation, and Air Conditioning) module 52, a heat-exchanger 53, a sub-condenser 54, a third expansion valve 55, an evaporator 56, an accumulator 57, a compressor 59, and a fourth expansion valve 62, which are connected via the refrigerant line 51.

First, the HVAC module 52 is provide inside with an evaporator 56 connected through the refrigerant line 51, and an opening and closing door 52b that controls the outside air passing through the evaporator 56 according to a cooling mode, or a heating mode, or a heating and dehumidification mode of the vehicle to selectively inflow to the internal condenser 52a.

That is, the opening/closing door 52b is opened so that the outside air passing through the evaporator 56 inflows into the internal condenser 52a in the heating mode of the vehicle. Conversely, in the cooling mode of the vehicle, the opening/closing door 52b closes the internal condenser 52a side so that the external air cooled while passing through the evaporator 56 flows directly into the vehicle interior.

In the present embodiment, the heat-exchanger 53 is connected to the refrigerant line 51 through which the refrigerant flows. Also, the heat-exchanger 53 may be connected to the second coolant line 21 so that the coolant circulating in the second coolant line 21 passes.

This heat-exchanger 53, according to the selective operation of the gas injection device 70 according to each mode of the vehicle, may additionally condense or evaporate the refrigerant condensed in the internal condenser 52a through the heat-exchange with the coolant supplied through the second coolant line 21.

That is, the heat-exchanger 53 may be a water-cooled heat-exchanger in which coolant is inflowed.

In the present embodiment, the sub-condenser 54 may be provided in the refrigerant line 51 between the heat-exchanger 53 and the evaporator 56.

Here, the sub-condenser 54 may additionally condense the refrigerant condensed in the heat-exchanger 53 through heat-exchange with the outside air. That is, the sub-condenser 54 is disposed in front of the radiator 12 to mutually heat-exchange the refrigerant flowing into the interior with the outside air.

That is, the sub-condenser 54 may be an air-cooled heat-exchanger that condenses a refrigerant by using outside air.

As such, when the heat-exchanger 53 condenses the refrigerant, the sub-condenser 54 increases sub-cooling of the refrigerant by further condensing the refrigerant condensed in the heat-exchanger 53, thereby improving a coefficient of performance (COP), which is a coefficient of the cooling capacity relative to the power required by the compressor.

The third expansion valve 55 is provided in the refrigerant line 51 between the sub-condenser 54 and the evaporator 56. The third expansion valve 55 receives the refrigerant that has passed through the sub-condenser 54 and selectively expands it.

The accumulator 57 is provided in the refrigerant line 51 between the evaporator 56 and the compressor 59, and is connected to the refrigerant connection line 61.

The accumulator 57 improves the efficiency and durability of the compressor 59 by supplying only gas refrigerant to the compressor 59.

In the present embodiment, one end of the refrigerant connection line 61 is connected to the refrigerant line 51 between the sub-condenser 54 and the third expansion valve 55. Also, the other end of the refrigerant connection line 61 may be connected to the refrigerant line 51 connected to the accumulator 57.

Here, the accumulator 57 may supply a gas refrigerant of the refrigerant supplied through the refrigerant connection line 61 to the compressor 59.

On the other hand, the refrigerant connection line 61 may be provided with a fourth expansion valve 62.

The fourth expansion valve 62, when cooling the battery module 33 by using the refrigerant heat-exchanged with the coolant, may expand the refrigerant flowing in through the refrigerant connection line 61 to inflow into the chiller 40.

That is, the fourth expansion valve 62 expands the refrigerant exhausted from the sub-condenser 54 and inflows it into the chiller 40 in a state that the temperature is deteriorated, thereby further deteriorating the water temperature of the coolant passing through the chiller 40.

Accordingly, the coolant, whose water temperature is lowered while passing through the chiller 40, is inflowed into the battery module 33 and may be cooled more efficiently.

The compressor 59 is connected via the refrigerant line 51 between the internal condenser 52*a* and the heat-exchanger 53. The compressor 59 compresses the refrigerant in the gas state and may supply the compressed refrigerant to the heat-exchanger 53.

The air conditioner device 50 configured in this way may further include a first branched line 63, a second branched line 65, a third branched line 66, a dehumidification line 68, and a sub-supply line 69.

First, one end of the first branched line 63 is connected to the fourth expansion valve 62. The other end of the first branched line 63 is connected to the refrigerant line 51 provided between the evaporator 56 and the accumulator 57.

Here, the first branched line 63 may be selectively opened and closed through the operation of the fourth expansion valve 62 in the vehicle heating mode.

That is, when the first branched line 63 is opened, the refrigerant inflowed from the refrigerant connection line 61 to the fourth expansion valve 62 may be supplied to the accumulator 57 along the refrigerant line 51 without passing the chiller 40.

The second branched line 65 selectively inflows the refrigerant exhausted from the heat-exchanger 53 directly to the accumulator 57 through the operation of the refrigerant valve 64 provided in the refrigerant line 51 between the heat-exchanger 53 and the sub-condenser 54.

Here, one end of the second branched line 65 is connected to the refrigerant valve 64. Also, the other end of the second branched line 65 may be connected to the accumulator 57.

Here, the refrigerant valve 64 may open the second branched line 65 in the vehicle's heating mode and close the refrigerant line 51 connected to the sub-condenser 54.

Conversely, the refrigerant valve 64 may close the second branched line 65 in the vehicle's cooling mode and open the refrigerant line 51 connected to the sub-condenser 54.

In the present embodiment, one end of the third branched line 66 is connected to the refrigerant line 51 between the heat-exchanger 53 and the gas injection device 70. Also, the other end of the third branched line 66 may be connected to the control valve 67.

Here, the third branched line 66 may be selectively opened and closed through the operation of the control valve 67 in the heating mode or the heating and dehumidification mode of the vehicle.

One end of the dehumidification line 68 may be connected to the control valve 67. The other end of the dehumidification line 68 may be connected to the refrigerant line 51 between the evaporator 56 and the third expansion valve 55.

Here, the dehumidification line 68 may be opened through the operation of the control valve 67 in the heating and dehumidification mode of the vehicle.

Also, one end of the sub-supply line 69 may be connected to the control valve 67. The other end of the sub-supply line 69 may be connected to the refrigerant line 51 between the heat-exchanger 53 and the sub-condenser 54.

The sub-supply line 69 may be selectively opened by the operation of the control valve 67 in the heating mode of the vehicle.

The sub-supply line 69 may bypass some of the refrigerant supplied to the heat-exchanger 53 to be supplied to the sub-condenser 54.

Also, the heat pump system according to the present embodiment may further include the gas injection device 70.

The gas injection device 70 is provided in the air conditioner device 50. The gas injection device 70 may selectively expand the refrigerant supplied from the internal condenser 52*a* to be supplied to the heat-exchanger 53.

In addition, the gas injection device 70 may selectively supply a portion of the refrigerant supplied from the internal condenser 52*a* to the compressor 59 to increase the flow rate of the refrigerant circulating in the refrigerant line 51.

The gas injection device 70 configured in this way may be selectively operated in the heating mode of the vehicle.

Here, the gas injection device 70 includes a gas-liquid separator 71, a supply unit 72, a first expansion valve 73, a second expansion valve 74, and a supply line 75.

First, the gas-liquid separator 71 may selectively exhaust the refrigerant by separating it into the gas refrigerant and the liquid refrigerant among the refrigerants inflowed therein.

The supply unit 72 may be connected to the internal condenser 52*a* through the refrigerant line 51 so that the refrigerant supplied from the internal condenser 52*a* inflows.

In the present embodiment, the first expansion valve 73 may be provided between the gas-liquid separator 71 and the supply unit 72 to selectively expand the refrigerant supplied to the supply unit 72 to be supplied to the gas-liquid separator 71.

The second expansion valve 74 may be provided between the gas-liquid separator 71 and the supply unit 72 to selectively expand the refrigerant supplied to the supply unit 72 to be supplied to the heat-exchanger 53 or to supply the refrigerant supplied from the gas-liquid separator 71 to the heat-exchanger 53.

Here, the second expansion valve 74 and the fourth expansion valve 62 selectively expand the refrigerant while controlling the flow of the refrigerant, and may be a 3-way electronic expansion valve having two inlets and one outlet.

Also, the supply line 75 connects the gas-liquid separator 71 and the compressor 59. The supply line 75 may selectively supply the refrigerant in the gas state from the gas-liquid separator 71 to the compressor 59 when the refrigerant is supplied to the gas-liquid separator 71.

That is, the supply line 75 may connect the gas-liquid separator 71 and the compressor 59 so that the gas refrigerant separated by the gas-liquid separator 71 is selectively inflowed to the compressor 59.

On the other hand, when the gas injection device 70 is operated in the heating mode of the vehicle, the first expansion valve 73 may expand the refrigerant supplied from the internal condenser 52a through the supply unit 72 to be supplied to the gas-liquid separator 71.

Here, the supply line 75 is opened. The gas-liquid separator 71 may supply the refrigerant in the gas state to the compressor 59 through the opened supply line 75 among the refrigerant inflowed into the inside.

Also, the second expansion valve 74 may expand the refrigerant supplied from the gas-liquid separator 71 to flow into the refrigerant line 51.

Conversely, when the gas injection device 70 is not operated in the heating mode of the vehicle, the operation of the first expansion valve 73 is stopped.

Accordingly, the inflow of refrigerant to the gas-liquid separator 71 may be blocked.

Also, the second expansion valve 74 may expand the refrigerant supplied from the internal condenser 52a through the supply unit 72 to be supplied to the heat-exchanger 53.

In addition, in the case of the cooling mode or the dehumidification mode of the vehicle, the operation of the first expansion valve 73 in the gas injection device 70 may be stopped.

Accordingly, the inflow of the refrigerant to the gas-liquid separator 71 may be blocked.

Also, the second expansion valve 74 may flow the refrigerant supplied from the internal condenser 52a through the supply unit 72 through the refrigerant line 51 without the expansion.

Here, according to the optional operation of the second expansion valve 74, the heat-exchanger 53 may additionally condense or evaporate the refrigerant supplied from the internal condenser 52a or the refrigerant exhausted from the gas-liquid separator 71 through heat-exchange with the outside air.

When the heat-exchanger 53 condenses the refrigerant, the heat-exchanger 53 further condenses the refrigerant condensed in the internal condenser 52a, thereby increasing the sub-cool of the refrigerant, and thereby improving a coefficient of performance (COP), which is a coefficient of the cooling capacity relative to the power required by the compressor.

That is, in the cooling mode of the vehicle, the refrigerant that has passed through the internal condenser 52a may be directly supplied to the heat-exchanger 53 without being expanded by the operation of the second expansion valve 74 without passing the gas-liquid separator 71.

By this operation, the pressure of the refrigerant circulating along the refrigerant line 51 in the vehicle's cooling mode can be reduced, and the cooling performance of the vehicle's interior may be improved.

Meanwhile, in the present embodiment, the first expansion valve 73 selectively expands the refrigerant while controlling the flow of the refrigerant passing through the refrigerant line 51 and may be a 2-way electronic expansion valve with one inlet and one outlet.

In addition, the refrigerant valve 64 and the control valve 67 may be a 3-way valve capable of a distribution of a flow rate.

Hereinafter, the operation and action of the heat pump system for the vehicle according to an embodiment of the present invention configured as described above will be described in detail with reference to FIG. 2 to FIG. 7.

First, the operation for the case of cooling the electrical component 23 and the battery module 33 by using the coolant in the heat pump system for the vehicle according to an embodiment of the present invention is described with reference to FIG. 2.

Figure 2:
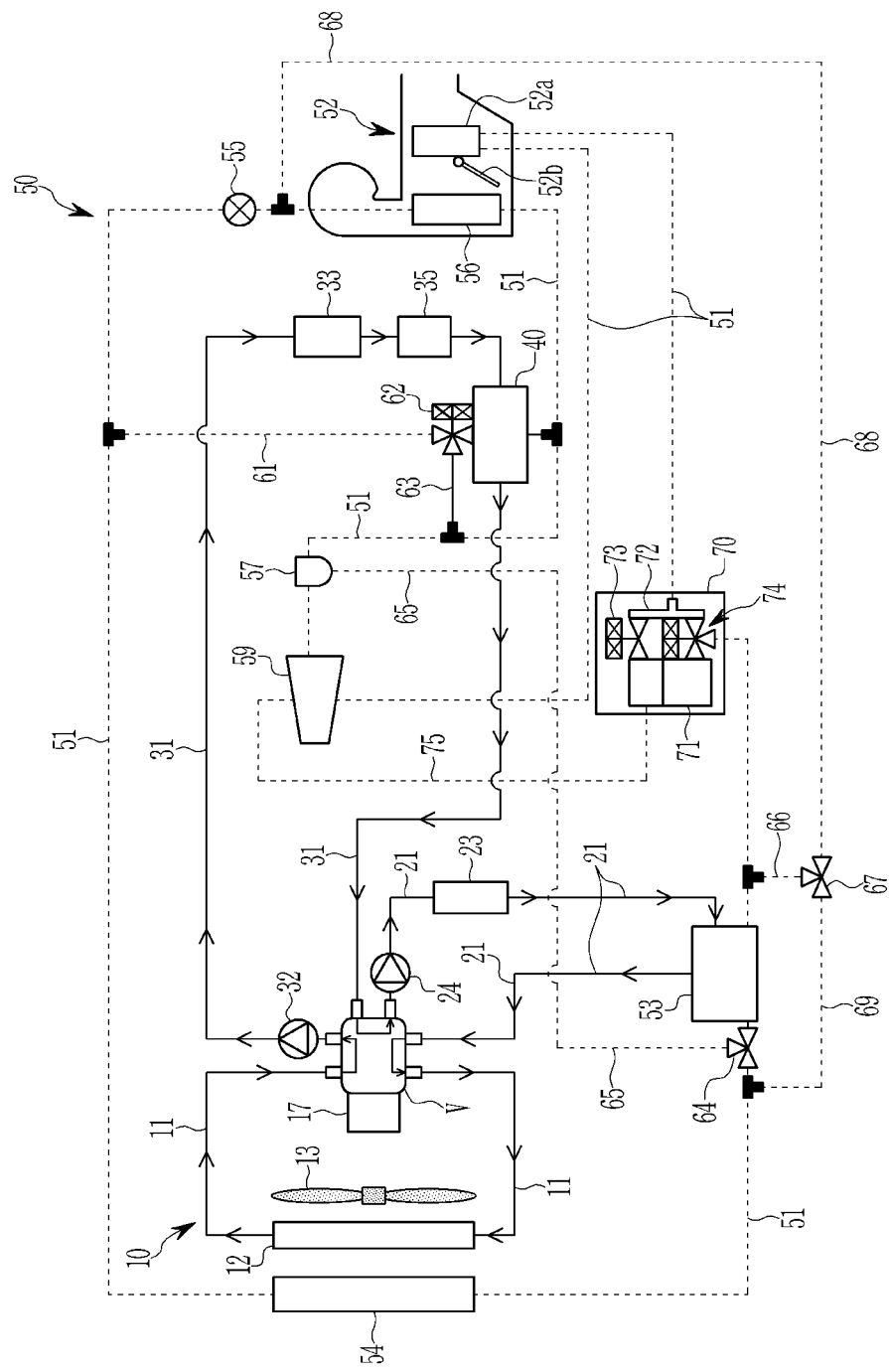
FIG. 2 is an operation state diagram for cooling electrical components and a battery module by using a coolant in a heat pump system for a vehicle according to an embodiment of the present invention.

FIG. 2 is an operation state diagram for cooling an electrical component and a battery module in a heat pump system for a vehicle according to an embodiment of the present invention.

Referring to FIG. 2, the first coolant line 11 is connected to one end of the third coolant line 31 through the operation of the multi-way valve V.

The other end of the third coolant line 31 is connected to one end of the second coolant line 21 through the operation of the multi-way valve V.

The other end of the second coolant line 21 is connected to the first coolant line 11 through the operation of the multi-way valve V.

That is, the first coolant line 11, the second coolant line 21, and the third coolant line 31 may be interconnected by the operation of the multi-way valve V to form one connected circuit in which the coolant cooled by the radiator 12 circulates.

Accordingly, the coolant cooled by the radiator 12 is supplied to the battery module 33 along the third coolant line 31 from the multi-way valve V through the operation of the second water pump 32.

That is, the low temperature coolant cooled by the radiator 12 is supplied to the battery module 33 first, so that the battery module 33 may be efficiently cooled.

The coolant that has passed through the battery module 33 flows back to the multi-way valve V along the third coolant line 31. Then, the coolant may be supplied to the electrical component 23 along the second coolant line 21 through the operation of the first water pump 24.

Accordingly, the electrical component 23 may be efficiently cooled by the coolant supplied to the second coolant line 21.

The coolant that has passed through the electrical component 23 flows into the multi-way valve V along the second coolant line 21. Then, the coolant may be supplied to the radiator 12 along the first coolant line 11.

As such, the coolant cooled by the radiator 12 respectively cools the electrical component 23 and the battery module 33 while sequentially circulating along the first coolant line 11, the third coolant line 31, the second coolant line 21, and the first coolant line 11 through the operation of the first and second water pumps 24 and 32, thereby efficiently cooling the electrical component 23 and the battery module 33.

Here, the air conditioner device 50 and the gas injection device 70 are not operated.

Meanwhile, in the present embodiment, the cooling of both the electrical component 23 and the battery module 33 with the coolant cooled by the radiator 12 is described, but the present invention is not limited thereto.

That is, when cooling either one of the electrical component 23 or the battery module 33 separately, the first water pump 24 or the second water pump 32 may be selectively operated together with the operation control of the multi-way valve V.

In the cooling mode of the vehicle, the operation of the case for cooling the battery module 33 is described with reference to FIG. 3.

Figure 3:
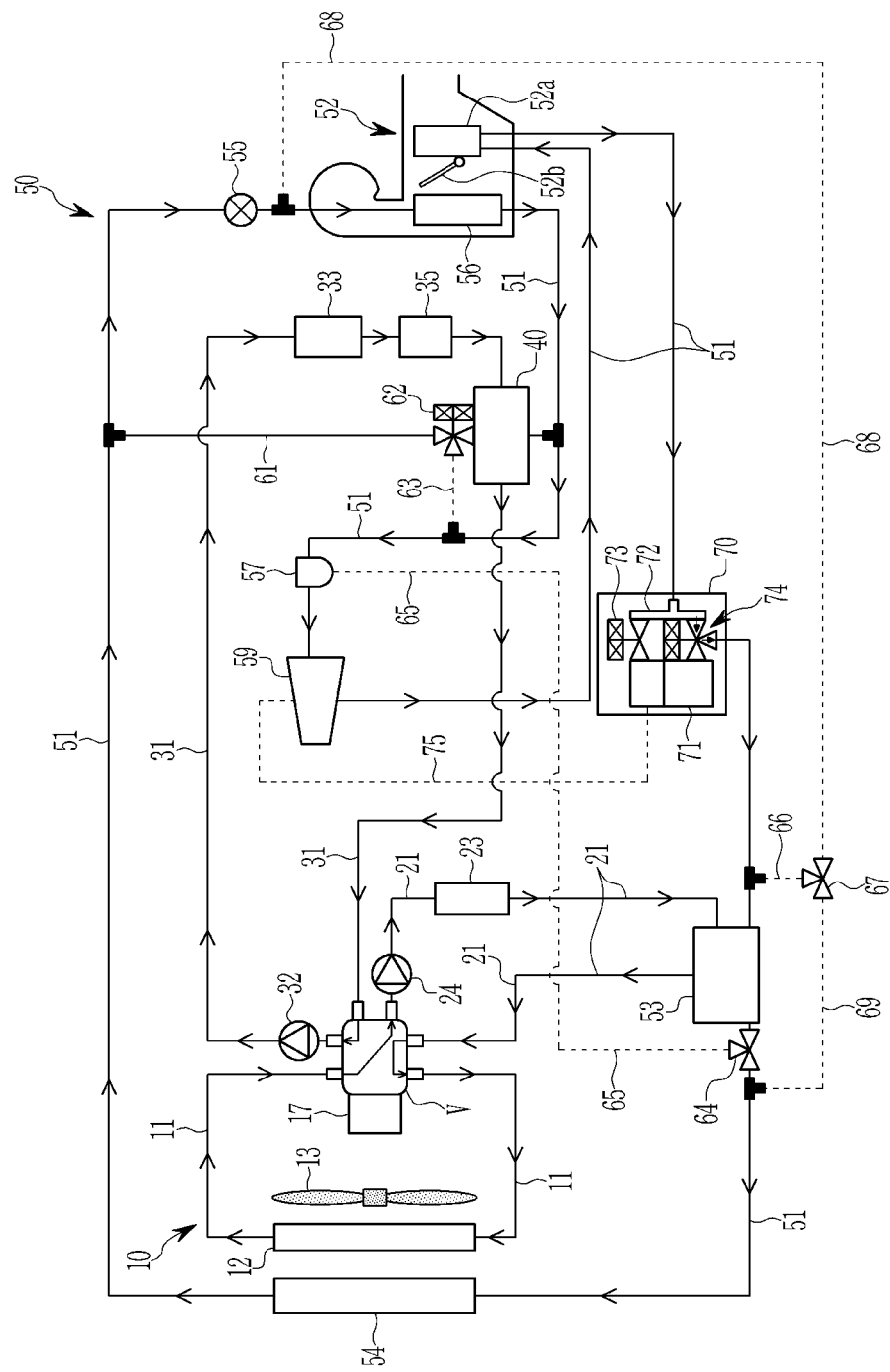
FIG. 3 is an operation state diagram for cooling a battery module by using a refrigerant in a cooling mode of a vehicle in a heat pump system for a vehicle according to an embodiment of the present invention.

FIG. 3 is an operation state diagram for cooling a battery module by using a refrigerant during a cooling mode of a vehicle in a heat pump system for a vehicle according to an embodiment of the present invention.

Referring to FIG. 3, in the cooling apparatus 10, the first coolant line 11 is connected to the second coolant line 21 through the operation of the multi-way valve V for the cooling of the electrical component 23 and the heat-exchanger 53.

Accordingly, in the cooling apparatus 10, the coolant cooled by the radiator 12 may circulate through the electrical component 23 and the heat-exchanger 53 as it flows along the first coolant line 11 and the second coolant line 21 through the operation of the first water pump 24.

Here, the heat-exchanger 53 may condense the refrigerant through heat-exchange with the coolant.

Meanwhile, the third coolant line 31 may form a closed and sealed circuit independent of the first and second coolant lines 11 and 21 through the operation of the multi-way valve V.

Accordingly, in the third coolant line 31, the coolant that has passed through the chiller 40 through the operation of the second water pump 32 may be supplied to the battery module 33.

That is, in the state that one end and the other end of the third coolant line 31 are interconnected through the operation of the multi-way valve V, the coolant may continue to be circulated sequentially through the battery module 33 and the chiller 40 along the third coolant line through the operation of the second water pump 32.

Here, the coolant that has passed through the chiller 40 continues to circulate along the third coolant line 31 and may repeatedly pass through the battery module 33.

In the air conditioner device 50, each constituent element operates to cool the vehicle interior. Accordingly, the refrigerant is circulated along the refrigerant line 51.

At this time, the first branched line 63 is closed through the operation of the fourth expansion valve 62. Also, the refrigerant connection line 61 may be opened through the operation of the fourth expansion valve 62.

Here, the second branched line 65 is closed through the operation of the refrigerant valve 64. In addition, the refrigerant valve 64 may open the refrigerant line 51 connected to the sub-condenser 54 so that the heat-exchanger 53 is connected to the sub-condenser 54.

Also, the refrigerant line 51 connecting the sub-condenser 54 and the evaporator 16 is opened through the operation of the third expansion valve 55.

In addition, the third branched line 66, the dehumidification line 68, and the sub-supply line 69 may be closed through the operation of the control valve 67.

Then, the refrigerant that has passed through the sub-condenser 54 may be circulated along the refrigerant line 51 and the refrigerant connection line 61.

Here, the third and fourth expansion valves 55 and 62 may expand the refrigerant so that the expanded refrigerant is supplied to the evaporator 56 and the chiller 40, respectively.

Also, the sub-condenser 54 may further condense the refrigerant inflowed from the heat-exchanger 53 through heat-exchange with outside air.

Also, the heat-exchanger 53 condenses the refrigerant by using the coolant flowing along the second coolant line 21.

Meanwhile, the coolant that has passed through the chiller 40 is cooled through heat-exchange with the expanded refrigerant supplied to the chiller 40.

The coolant cooled in the chiller 40 is supplied to the battery module 33 along the third coolant line 31. Accordingly, the battery module 33 is efficiently cooled by the coolant cooled in the chiller 40.

That is, the fourth expansion valve 62 expands some of the refrigerant that has passed through the sub-condenser 54 to supply the expanded refrigerant to the chiller 40 and opens the refrigerant connection line 61.

Accordingly, some refrigerant exhausted from the sub-condenser 54 is expanded through the operation of the second expansion valve 74, thereby being in a state of low temperature and low pressure and flowing into the chiller 40 connected to the refrigerant connection line 61.

Then, the refrigerant inflowed into the chiller 40 is heat-exchanged with the coolant and then flows into the compressor 59 after passing through the accumulator 57 through the refrigerant connection line 61.

The coolant whose temperature rises while cooling the battery module 33 is cooled through heat-exchange inside the chiller 40 with the refrigerant of low temperature and low pressure.

The cooled coolant is supplied back to the battery module 33 along the third coolant line 31.

That is, the coolant may efficiently cool the battery module 33 while repeatedly performing the operation as described above.

Meanwhile, the remaining refrigerant exhausted from the sub-condenser 54 flows through the refrigerant line 51 to cool the interior of the vehicle and sequentially passes through the third expansion valve 55, the evaporator 56, the accumulator 57, the compressor 59, the internal condenser 52a, and the heat-exchanger 53.

Here, the outside air inflowed to the HVAC module 52 is cooled while passing through the evaporator 56 by the refrigerant in a low temperature state inflowed to the evaporator 56.

At this time, the opening/closing door 52b closes the part passing through the internal condenser 52a so that the cooled outside air does not pass through the internal condenser 52a. Therefore, the cooled outside air may be directly inflowed into the inside of the vehicle, thereby cooling the vehicle interior.

Meanwhile, in the evaporator 56, the refrigerant, which has an increased amount of condensation while sequentially passing through the internal condenser 52a, the heat-exchanger 53, and the sub-condenser 54, is expanded and supplied, so that the refrigerant may be evaporated with a lower temperature.

That is, in the present embodiment, the internal condenser 52a primarily condenses the refrigerant through heat-exchange with the outside air, the heat-exchanger 53 secondarily condenses the refrigerant through heat-exchange with the coolant, and then the sub-condenser 54 additionally condenses the refrigerant through heat-exchange with the outside air, and the formation of sub-cooling of the refrigerant becomes favorable.

And as the refrigerant formed into the sub-cool is evaporated to a lower temperature in the evaporator 56, the temperature of the outside air passing through the evaporator 56 may be further lowered, thereby improving cooling performance and efficiency.

Meanwhile, in the gas injection device 70, the second expansion valve 74 may supply the refrigerant supplied from the internal condenser 52a to the heat-exchanger 53 without the expansion.

By repeating the above process, the refrigerant may cool the coolant through heat-exchange while simultaneously passing through the chiller 40, which cools the room in the vehicle's cooling mode.

The low-temperature coolant cooled in the chiller 40 flows into the battery module 33. Accordingly, the battery module 33 may be efficiently cooled by the supplied low-temperature coolant.

In the present embodiment, in the heating mode of the vehicle, the operation for the case for recovery of the heat from an external heat source and the waste heat of the electrical component 23 is described with reference to FIG. 4.

Figure 4:
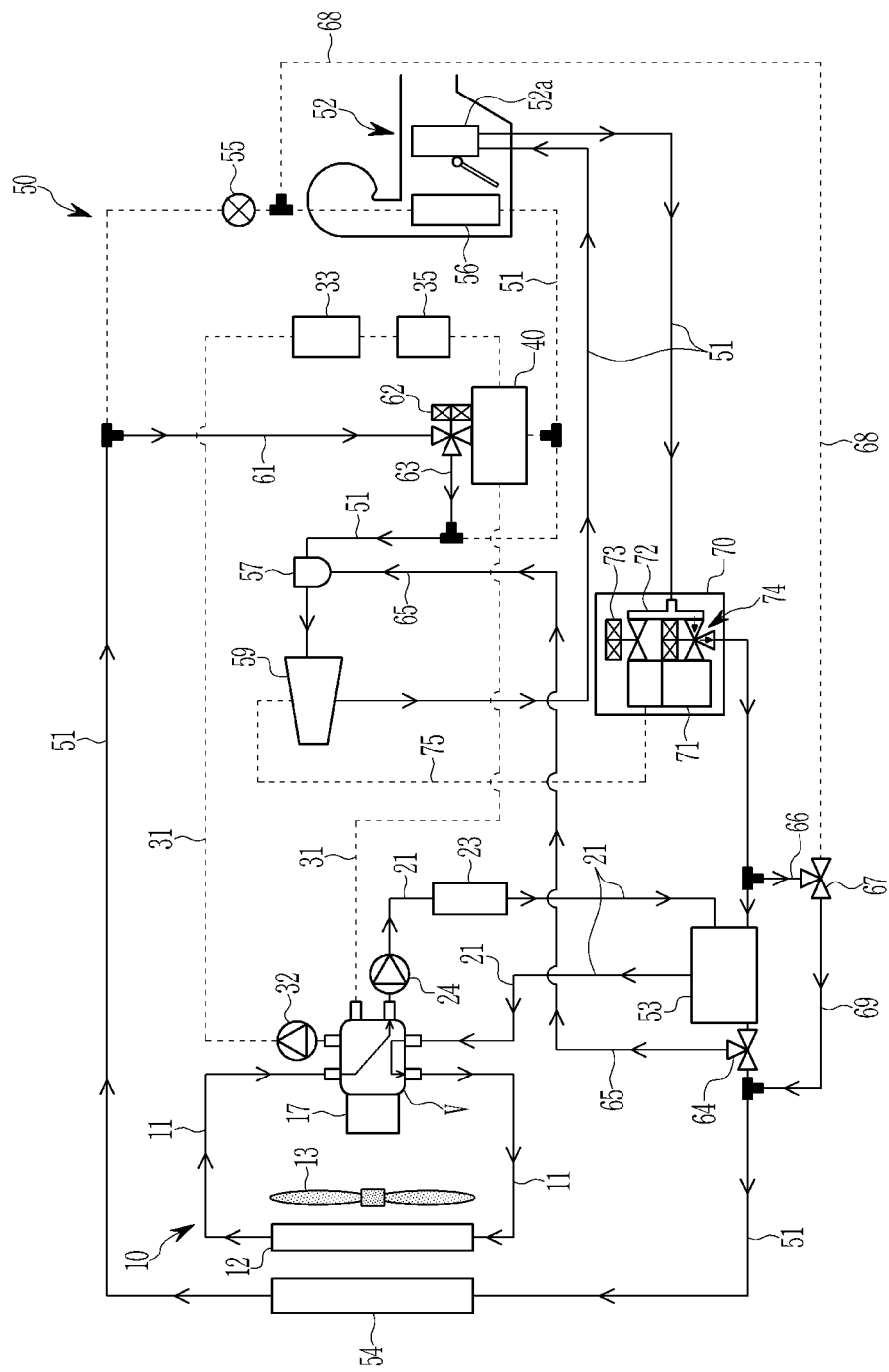
FIG. 4 is an operation state diagram for an external heat source according to a heating mode and a waste heat recovery of electrical components in a heat pump system for a vehicle according to an embodiment of the present invention.

FIG. 4 is an operation state diagram for an external heat source according to a heating mode and waste heat recovery of electrical components in a heat pump system for a vehicle according to an embodiment of the present invention.

Referring to FIG. 4, the heat pump system may absorb the heat from an external heat source from the outside air together with the waste heat of the electrical component 23.

First, in the cooling apparatus 10, the first coolant line 11 is connected to the second coolant line 21 through the operation of the multi-way valve V for cooling the electrical component 23 and the heat-exchanger 53.

Accordingly, in the cooling apparatus 10, the coolant cooled by the radiator 12 may circulate through the electrical component 23 and the heat-exchanger 53 while flowing along the first coolant line 11 and the second coolant line 21 through the operation of the first water pump 24.

At this time, the coolant recovers the waste heat from the electrical component 15 while cooling the electrical component 15, and the temperature rises, and the temperature may further rise by absorbing the heat from an external heat source while passing through the radiator 12. The coolant whose temperature has risen through this operation can be supplied to the heat-exchanger 53.

Meanwhile, the third coolant line 31 may be closed through the operation of the multi-way valve V. Accordingly, the operation of the second water pump 32 is stopped, and coolant is not circulated in the third coolant line 31.

That is, the coolant whose temperature is increased by the heat from an external heat source in the radiator 12 and the waste heat of the electrical component 23 passes through the heat-exchanger 53 through the operation of the first water pump 24.

At this time, the heat-exchanger 53 may recover the heat from an external heat source and the waste heat of the electrical component 23 while heat-exchanging the supplied coolant with the refrigerant.

Meanwhile, in the air conditioner device 50, each constituent element operates to heat the vehicle interior. Accordingly, the refrigerant circulates along the refrigerant line 51.

Here, a portion of the refrigerant line 51 connecting the sub-condenser 54 and the evaporator 56 is closed through the operation of the third expansion valve 55.

The first branched line 63 is opened by the operation of the fourth expansion valve 62. At the same time, a portion of the refrigerant connection line 61 is opened through the operation of the fourth expansion valve 62 so that the refrigerant line 51 connected to the sub-condenser 54 is connected to the refrigerant connection line 61.

In this state, a portion of the refrigerant connection line 61 connected to the chiller 40 with respect to the fourth expansion valve 62 may be closed.

The second branched line 65 is opened through the operation of the refrigerant valve 64. The third branched line 66 and the sub-supply line 69 may be opened by the operation of the control valve 67.

Accordingly, the refrigerant inflowed into the third branched line 66 and the sub-supply line 69 may be supplied to the sub-condenser 54 along the refrigerant line 51.

At this time, in the gas injection device 70, the operation of the first expansion valve 73 and the gas-liquid separator 71 is stopped.

Also, the second expansion valve 74 may supply the refrigerant supplied from the internal condenser 52a through the supply unit 72 to the heat-exchanger 53 by the expansion.

Accordingly, the heat-exchanger 53 may recover the heat from an external heat source and the waste heat of the electrical component 23 while evaporating the refrigerant expanded while passing through the second expansion valve 74 through heat-exchange with the coolant whose temperature is increased while recovering the heat from an external heat source and simultaneously cooling the electrical component 23.

The refrigerant that has passed through the heat-exchanger 53 is supplied to the accumulator 57 along the second branched line 65 opened by the operation of the refrigerant valve 64.

On the other hand, some of the refrigerant expanded while passing through the second expansion valve 74 may inflow into the third branched line 66 and the sub-supply line 69 opened by the operation of the control valve 67.

The refrigerant inflowed into the sub-supply line 69 is evaporated through heat-exchange with the outside air while passing through the sub-condenser 54, thereby directly recovering the heat from an external heat source.

The refrigerant that has passed through the sub-condenser 54 sequentially passes through a portion of the refrigerant line 51, the opened refrigerant connection line 61, and the first branched line 63 to be supplied to the accumulator 57.

The refrigerant supplied to the accumulator 57 is separated into a gas and a liquid. Of the refrigerant separated into a gas and a liquid, the gas refrigerant is supplied to the compressor 59.

The refrigerant compressed from the compressor 59 at high temperature and high pressure is inflowed into the internal condenser 52a.

Here, the refrigerant supplied to the internal condenser 52a may increase the temperature of the outside air flowing into the HVAC module 52.

The opening/closing door 52b is opened so that outside air inflowing into the HVAC module 52 and passing through the evaporator 56 passes through the internal condenser 52a.

Accordingly, the outside air inflowed from the outside is inflowed in the uncooled room temperature state when passing through the evaporator 56 to which the refrigerant is not supplied. The inflowed outdoor air is converted to a high temperature state while passing through the internal condenser 52a and inflowed into the vehicle interior, thereby realizing the heating of the vehicle interior.

In the present embodiment, in the heating mode of the vehicle, the operation for a case that the gas injection device 70 is operated while recovering the heat from an external heat source and the waste heat of the electrical component 23 is described with reference to FIG. 5.

Figure 5:
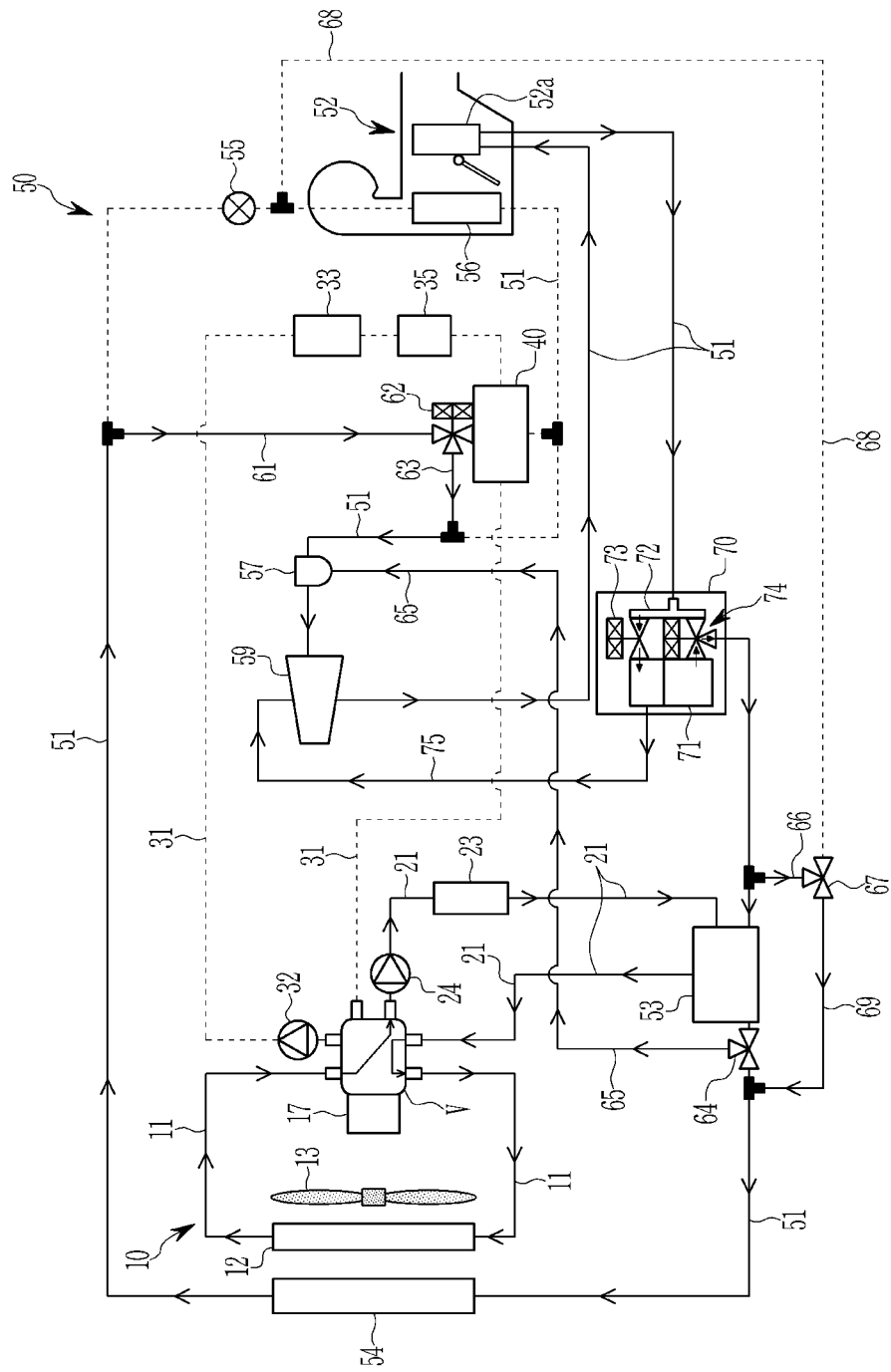
FIG. 5 is an operation state diagram for an external heat source according to a heating mode, and waste heat recovery of electrical components and an operation of a gas injection device in a heat pump system for a vehicle according to an embodiment of the present invention.

FIG. 5 is an operation state diagram for an external heat source according to a heating mode, and waste heat recovery of electrical components and an operation of a gas injection device in a heat pump system for a vehicle according to an embodiment of the present invention.

Referring to FIG. 5, the heat pump system may absorb the heat from an external heat source from the outside air together with the waste heat of the electrical component 23.

First, in the cooling apparatus 10, the first coolant line 11 is connected to the second coolant line 21 through the operation of the multi-way valve V for cooling the electrical component 23 and the heat-exchanger 53.

Accordingly, in the cooling apparatus 10, the coolant cooled by the radiator 12 may circulate through the electrical component 23 and the heat-exchanger 53 while flowing along the first coolant line 11 and the second coolant line 21 through the operation of the first water pump 24.

At this time, the coolant recovers the waste heat from the electrical component 23 while cooling the electrical component 23 and the temperature rises, and the temperature may further rise by absorbing the heat from an external heat source while passing through the radiator 12. The coolant whose temperature has risen through this operation may be supplied to the heat-exchanger 53.

Meanwhile, the third coolant line 31 may be closed through the operation of the multi-way valve V. Accordingly, the operation of the second water pump 32 is stopped, and the coolant is not circulated in the third coolant line 31.

That is, the coolant whose temperature is increased by the heat from an external heat source from the radiator 12 and the waste heat of the electrical component 23 passes through the heat-exchanger 53 through the operation of the first water pump 24.

At this time, the heat-exchanger 53 may recover the heat from an external heat source and the waste heat of the electrical component 23 while heat-exchanging the supplied coolant with the refrigerant.

Meanwhile, in the air conditioner device 50, each constituent element operates to heat the vehicle interior. Accordingly, the refrigerant circulates along the refrigerant line 51.

Here, a portion of the refrigerant line 51 connecting the sub-condenser 54 and the evaporator 56 is closed through the operation of the third expansion valve 55.

The first branched line 63 is opened by the operation of the fourth expansion valve 62. At the same time, a portion of the refrigerant connection line 61 is opened through the operation of the fourth expansion valve 62 so that the refrigerant line 51 connected to the sub-condenser 54 is connected to the refrigerant connection line 61.

In this state, a portion of the refrigerant connection line 61 connected to the chiller 40 based on the fourth expansion valve 62 may be closed.

The second branched line 65 is opened through the operation of the refrigerant valve 64. The third branched line 66 and the sub-supply line 69 may be opened by the operation of the control valve 67.

Accordingly, the refrigerant inflowed into the third branched line 66 and the sub-supply line 69 may be supplied to the sub-condenser 54 along the refrigerant line 51.

Here, in the gas injection device 70, the first expansion valve 73 may expand the refrigerant supplied from the internal condenser 52a through the supply unit 72 to be supplied to the gas-liquid separator 71.

The gas-liquid separator 71 may supply the refrigerant in a gas state among the refrigerant supplied from the first expansion valve 73 to the compressor 59 through the opened supply line 75.

Also, the second expansion valve 74 may additionally expand the refrigerant supplied from the gas-liquid separator 71 to be supplied to the heat-exchanger 53 connected through the refrigerant line 51.

Accordingly, the heat-exchanger 53 may recover the heat from an external heat source and the waste heat of the electrical component 23 while evaporating the refrigerant expanded while passing through the second expansion valve 74 through heat-exchange with the coolant whose temperature is increased while recovering the heat from an external heat source and simultaneously cooling the electrical component 23.

The refrigerant that has passed through the heat-exchanger 53 is supplied to the accumulator 57 along the second branched line 65 opened by the operation of the refrigerant valve 64.

On the other hand, some of the refrigerant expanded while passing through the second expansion valve 74 may inflow into the third branched line 66 and the sub-supply line 69 opened by the operation of the control valve 67.

The refrigerant inflowed into the sub-supply line 69 is evaporated through heat-exchange with the outside air while passing through the sub-condenser 54, thereby directly recovering the heat from an external heat source.

The refrigerant that has passed through the sub-condenser 54 sequentially passes through a portion of the refrigerant line 51, the opened refrigerant connection line 61, and the first branched line 63 to be supplied to the accumulator 57.

The refrigerant supplied to the accumulator 57 is separated into a gas and a liquid. Of the refrigerant separated into a gas and a liquid, the gas refrigerant is supplied to the compressor 59.

The refrigerant compressed from the compressor 59 at high temperature and high pressure is inflowed into the internal condenser 52a.

Here, the refrigerant supplied to the internal condenser 52a may increase the temperature of the outside air flowing into the HVAC module 52.

The opening/closing door 52b is opened so that outside air inflowing into the HVAC module 52 and passing through the evaporator 56 passes through the internal condenser 52a.

Accordingly, the outside air inflowed from the outside is inflowed in the uncooled room temperature state when passing through the evaporator 56 to which the refrigerant is not supplied. The inflowed outdoor air is converted to a high temperature state while passing through the internal condenser 52a and inflowed into the vehicle interior, thereby realizing the heating of the vehicle interior.

Meanwhile, of the refrigerant supplied to the gas-liquid separator 71, the refrigerant in a gas state is supplied to the compressor 59 through the open supply line 75.

That is, the gas injection device 70 may increase the flow rate of the refrigerant circulating through the refrigerant line 51 by inflowing the refrigerant in the gas state separated while passing through the gas-liquid separator 71 to the compressor 59 through the supply line 75 again.

Also, the liquid refrigerant stored in the gas-liquid separator 71 may flow into the heat-exchanger 53 along the opened refrigerant line 51 through the operation of the second expansion valve 74, and some refrigerant inflows into the open third branched line 66 and the sub-supply line 69.

At this time, the second expansion valve 74 may expand the refrigerant supplied from the gas-liquid separator 71.

That is, in the gas injection device 70, the gas-liquid separator 71 may supply the gas refrigerant to the compressor 59 through the supply line 75 and supply the liquid refrigerant to the second expansion valve 74.

Then, the refrigerant may be expanded while passing through the second expansion valve 74 and may be evaporated through heat-exchange with the coolant in the heat-exchanger 53.

On the other hand, of the refrigerant expanded while passing through the second expansion valve 74, some refrigerant may inflow to the sub-condenser 54 along the opened third branched line 66, the sub-supply line 69, and a portion of the refrigerant line 51, and may be evaporated through heat-exchanges with the outside air at the sub-condenser 54.

Accordingly, the refrigerant may recover the heat from an external heat source from the heat-exchanger 53 and may smoothly recover the waste heat from the coolant whose temperature has risen while passing through the electrical component 23, and additionally may recover the heat from an external heat source from the sub-condenser 54, thereby improving the overall heating performance and efficiency.

That is, when the heating is required in an initial starting idle state (IDLE) or in an initial running state of the vehicle in the heat pump system according to the present embodiment, by absorbing the heat from an external heat source directly from the sub-condenser 54, absorbing the heat from an external heat source indirectly from the cooling apparatus 10, and simultaneously using the waste heat of the electrical component 23 to raise the refrigerant temperature, the power consumption of the compressor 59 may be reduced and the heating efficiency may be improved.

In addition, embodiments of the present invention may improve heating efficiency and performance while minimizing a use amount of a separate electric heater.

Furthermore, the gas injection device 7o may maximize the heating performance by increasing the flow rate of the refrigerant circulating in the refrigerant line 51.

On the other hand, in the present embodiment, the recovery of the heat from an external heat source and the waste heat of the electrical component 23 together is described as an embodiment, but it is not limited thereto, and the waste heat of the battery module 33 may also be selectively recovered.

That is, when the waste heat of the battery module 33 is recovered, the third coolant line 31 may be opened, and the refrigerant connection line 61 may be opened through the operation of the fourth expansion valve 62 so that the refrigerant is supplied to the chiller 40.

In the present embodiment, in the heating mode of the vehicle, the operation for the case that the gas injection device 70 is operated while recovering the waste heat of the electrical component 23 is described with reference to FIG. 6.

Figure 6:
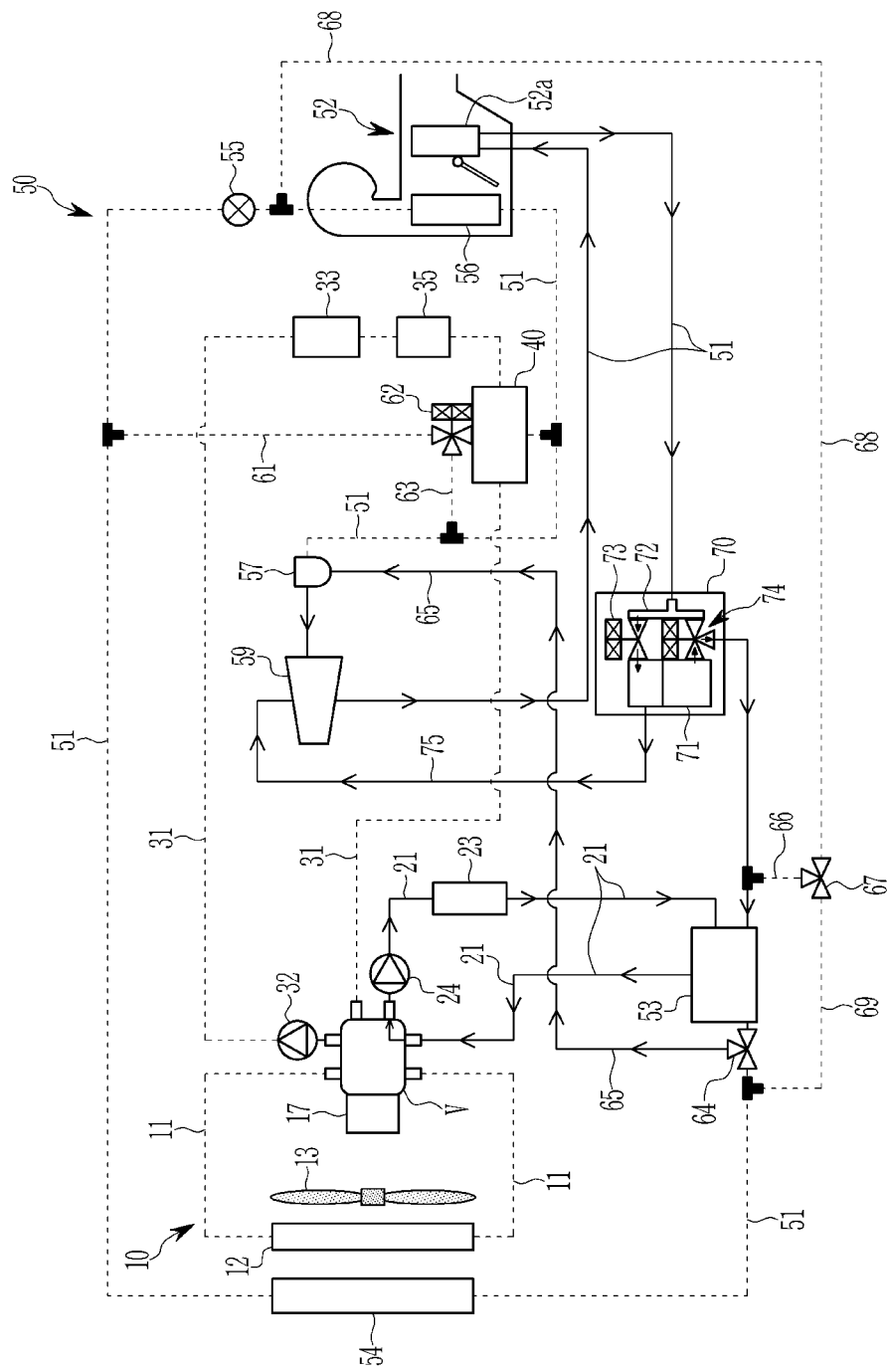
FIG. 6 is an operation state diagram for waste heat recovery of an electrical component according to a heating mode and an operation of a gas injection device in a heat pump system for a vehicle according to an embodiment of the present invention.

FIG. 6 is an operation state diagram for waste heat recovery of an electrical component according to a heating mode and an operation of a gas injection device in a heat pump system for a vehicle according to an embodiment of the present invention.

Referring to FIG. 6, the first coolant line 11 and the third coolant line 31 are closed by the operation of the multi-way valve V.

At the same time, one end and the other end of the second coolant line 21 may be interconnected through the operation of the multi-way valve V so that the second coolant line 21 forms an independent closed and sealed circuit.

Accordingly, in the second coolant line 21, the coolant that has passed through the electrical component 23 and the heat-exchanger 53 through the operation of the first water pump 24 may be continuously circulated.

Here, as the coolant recovers the waste heat from the electrical component 23 while cooling the electrical component 23, the temperature may be increased. The coolant whose temperature has risen through this operation may be supplied to the heat-exchanger 53.

That is, the coolant whose temperature is increased by the waste heat of the electrical component 23 passes through the heat-exchanger 53 through the operation of the first water pump 24.

At this time, the heat-exchanger 53 may recover the waste heat of the electrical component 23 while heat-exchanging the supplied coolant with the refrigerant.

Meanwhile, in the air conditioner device 50, each constituent element operates to heat the vehicle interior. Accordingly, the refrigerant circulates along the refrigerant line 51.

Here, the refrigerant line 51 connecting the sub-condenser 54 and the evaporator 56 is closed through the operation of the third expansion valve 55.

Also, the refrigerant connection line 61 and the first branched line 63 are closed through the operation of the fourth expansion valve 62.

That is, the refrigerant line 51 connecting the sub-condenser 54 and the evaporator 56 and the refrigerant connection line 61 connected to the chiller 40 are closed through the operation of the third and fourth expansion valves 55 and 62.

Meanwhile, the second branched line 65 is opened through the operation of the refrigerant valve 64. Also, the third branched line 66, the dehumidification line 68, and the sub-supply line 69 may be closed through the operation of the control valve 67.

Accordingly, the refrigerant that has passed through the heat-exchanger 53 may flow into the accumulator 57 through the opened second branched line 65.

Here, in the gas injection device 70, the first expansion valve 73 may expand the refrigerant supplied from the internal condenser 52a through the supply unit 72 to be supplied to the gas-liquid separator 71.

The gas-liquid separator 71 may supply the gas state refrigerant of the refrigerant supplied from the first expansion valve 73 to the compressor 59 through the opened supply line 75.

Also, the second expansion valve 74 may additionally expand the refrigerant supplied from the gas-liquid separator 71 to be supplied to the heat-exchanger 53 connected through the refrigerant line 51.

Accordingly, the heat-exchanger 53 recovers the waste heat of the electrical component 23 by evaporating the refrigerant expanded while passing the second expansion valve 74 through heat-exchange with the coolant whose temperature has risen while cooling the electrical component 23.

Meanwhile, the refrigerant that has passed through the heat-exchanger 53 is supplied to the accumulator 57 along the second branched line 65 opened by the operation of the refrigerant valve 64.

The refrigerant supplied to the accumulator 57 is separated into a gas and a liquid. Of the refrigerant separated into a gas and a liquid, the gas refrigerant is supplied to the compressor 59.

The refrigerant compressed from the compressor 59 at a high temperature and a high pressure is inflowed into the internal condenser 52a.

Here, the refrigerant supplied to the internal condenser 52a may increase the temperature of the outside air flowing into the HVAC module 52.

The opening/closing door 52b is opened so that outside air inflowing into the HVAC module 52 and passing through the evaporator 56 passes through the internal condenser 52a.

Accordingly, the outside air inflowed from the outside is inflowed in the uncooled room temperature state when passing through the evaporator 56 to which the refrigerant is not supplied. The inflowed outdoor air is converted to a high temperature state while passing through the internal condenser 52a and inflowed into the vehicle interior, thereby realizing the heating of the vehicle interior.

Meanwhile, among the refrigerant supplied to the gas-liquid separator 71, the refrigerant in a gas state is supplied to the compressor 59 through the open supply line 75.

That is, the gas injection device 70 may increase the flow rate of the refrigerant circulating through the refrigerant line 51 by inflowing the refrigerant in the gas state separated while passing through the gas-liquid separator 71 to the compressor 59 through the supply line 75 again.

Also, the liquid refrigerant stored in the gas-liquid separator 71 may flow into the heat-exchanger 53 along the refrigerant line 51 opened through the operation of the second expansion valve 74.

At this time, the second expansion valve 74 may expand the refrigerant supplied from the gas-liquid separator 71.

That is, in the gas injection device 70, the gas-liquid separator 71 may supply the gas refrigerant to the compressor 59 through the supply line 75 and supply the liquid refrigerant to the second expansion valve 74.

Then, the refrigerant may be expanded while passing through the second expansion valve 74 and be evaporated through heat-exchange with the coolant in the heat-exchanger 53.

Accordingly, the refrigerant may smoothly recover the waste heat from the coolant whose temperature has risen while passing through the electrical component 23 in the heat-exchanger 53, thereby improving the overall heating performance and efficiency.

That is, when the heating is required in an initial starting idle state (IDLE) or in an initial running state of the vehicle in the heat pump system according to the present embodiment, by using the waste heat of the electrical component 23 to increase the temperature of the refrigerant, it is possible to reduce the power consumption of the compressor 59 and improve the heating efficiency.

In addition, embodiments of the present invention may improve heating efficiency and performance while minimizing a use amount of a separate electric heater.

Furthermore, the gas injection device 70 may maximize the heating performance by increasing the flow rate of the refrigerant circulating in the refrigerant line 51.

In the present embodiment, the operation for the dehumidification mode of the vehicle is described with reference to FIG. 7.

Figure 7:
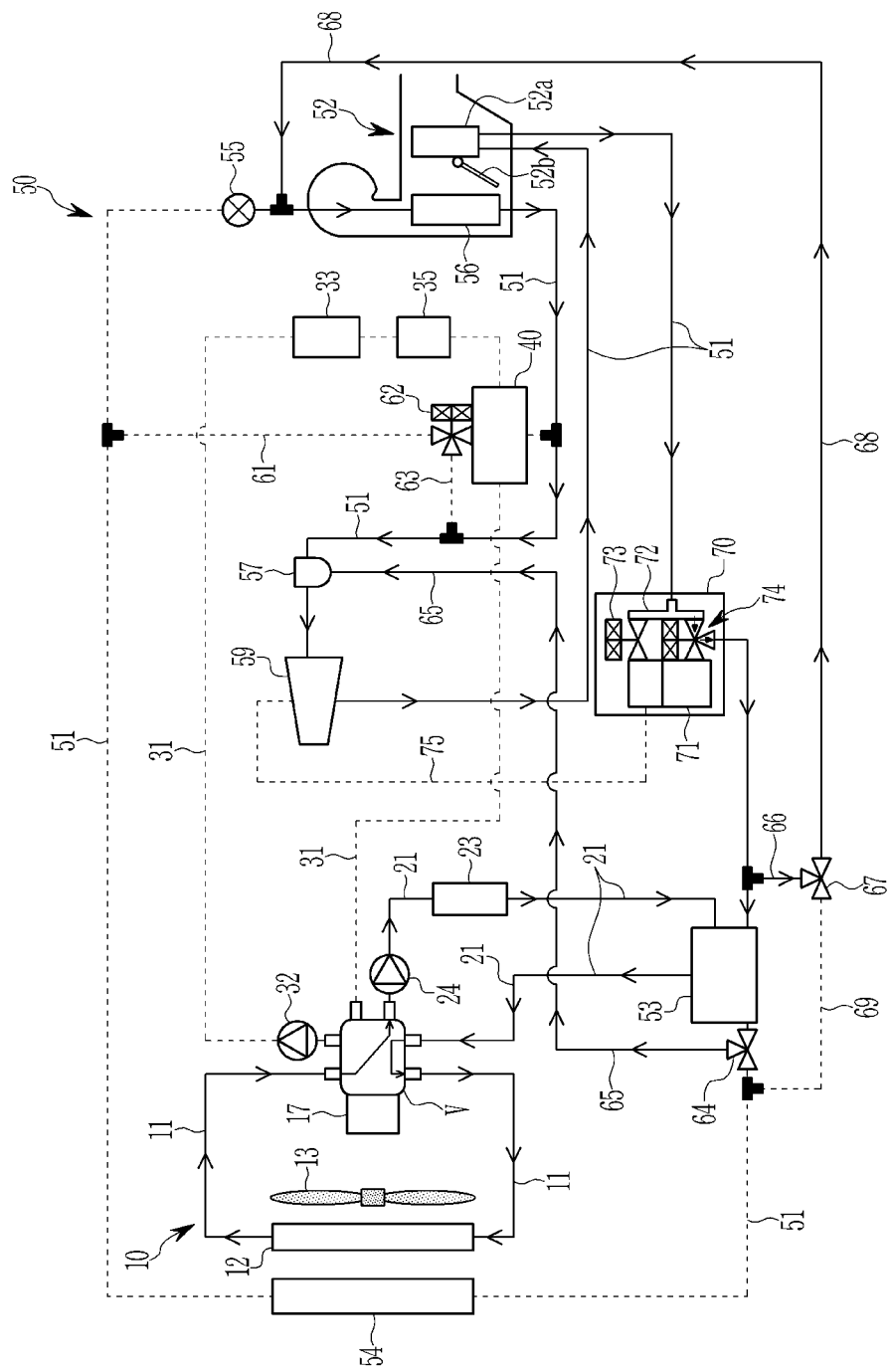
FIG. 7 is an operation state diagram for a dehumidification mode in a heat pump system for a vehicle according to an embodiment of the present invention.

FIG. 7 is an operation state diagram for a dehumidification mode in a heat pump system for a vehicle according to an embodiment of the present invention.

Referring to FIG. 7, the heat pump system may perform the dehumidifying mode while heating the vehicle interior.

First, in the cooling apparatus 10, the first coolant line 11 is connected to the second coolant line 21 through the operation of the multi-way valve V for cooling the electrical component 23 and the heat-exchanger 53.

Accordingly, in the cooling apparatus 10, the coolant cooled by the radiator 12 flows along the first coolant line 11 and the second coolant line 21 through the operation of the first water pump 24 and circulates through the electrical component 23 and the heat-exchanger 53.

At this time, the coolant recovers the waste heat from the electrical component 23 while cooling the electrical component 23 and the temperature rises, and the temperature may further rise by absorbing the heat from an external heat source while passing through the radiator 12. The coolant whose temperature has risen through this operation may be supplied to the heat-exchanger 53.

Meanwhile, the third coolant line 31 may be closed through the operation of the multi-way valve V. Accordingly, the operation of the second water pump 32 is stopped, and coolant is not circulated in the third coolant line 31.

That is, the coolant whose temperature is increased by the heat from an external heat source from the radiator 12 and the waste heat of the electrical component 23 passes through the heat-exchanger 53 through the operation of the first water pump 24.

At this time, the heat-exchanger 53 may recover the heat from an external heat source and the waste heat of the electrical component 23 while heat-exchanging the supplied coolant with the refrigerant.

Meanwhile, in the air conditioner device 50, each constituent element operates to heat the vehicle interior. Accordingly, the refrigerant circulates along the refrigerant line 51.

Here, the refrigerant line 51 connecting the sub-condenser 54 and the evaporator 56 is closed through the operation of the third expansion valve 55.

Also, the refrigerant connection line 61 and the first branched line 63 are closed through the operation of the fourth expansion valve 62.

That is, the refrigerant line 51 connecting the sub-condenser 54 and the evaporator 56 and the refrigerant connection line 61 connected to the chiller 40 are closed through the operation of the third and fourth expansion valves 55 and 62.

Meanwhile, the second branched line 65 is opened through the operation of the refrigerant valve 64. Also, the third branched line 66, the dehumidification line 68, and the sub-supply line 69 may be closed through the operation of the control valve 67.

At the same time, the sub-supply line 69 may be closed by operation of the control valve 67.

Accordingly, the refrigerant that has passed through the heat-exchanger 53 may flow into the accumulator 57 through the opened second branched line 65.

Here, in the gas injection device 70, the operation of the first expansion valve 73 and the gas-liquid separator 71 is stopped.

Also, the second expansion valve 74 may supply the refrigerant supplied from the internal condenser 52a through the supply unit 72 to be supplied to the heat-exchanger 53.

Accordingly, the heat-exchanger 53 may recover the heat from an external heat source and the waste heat of the electrical component 23 while evaporating the refrigerant expanded while passing through the second expansion valve 74 through heat-exchange with the coolant whose temperature is increased while recovering the heat from an external heat source and simultaneously cooling the electrical component 23.

Here, the third branched line 66 and the dehumidification line 68 may be opened through the operation of the control valve 67 so that some of the refrigerant expanded through the operation of the second expansion valve 74 is supplied to the evaporator 56.

Accordingly, of the refrigerant expanded in the second expansion valve 74, some refrigerant may be inflowed into the evaporator 56 through the opened third branched line 66 and the dehumidification line 68.

Also, the refrigerant evaporated from the heat-exchanger 53 is supplied to the accumulator 57 along the second branched line 65 opened by the operation of the refrigerant valve 64.

The refrigerant supplied to the accumulator 57 is separated into a gas and a liquid. Of the refrigerant separated into a gas and a liquid, the gas refrigerant is supplied to the compressor 59.

The refrigerant compressed from the compressor 59 at a high temperature and a high pressure is inflowed into the internal condenser 52a.

Here, the refrigerant supplied to the internal condenser 52a may increase the temperature of the outside air flowing into the HVAC module 52.

The opening/closing door 52b is opened so that the outside air that inflows into the HVAC module 52 and passes through the evaporator 56 passes through the internal condenser 52a.

That is, the outside air inflowed to the HVAC module 52 is dehumidified while passing through the evaporator 56 by the refrigerant in a low temperature state inflowed to the evaporator 56. Then, it is converted to a high temperature state while passing through the internal condenser 52a and inflows into the vehicle interior, thereby heating and dehumidifying the vehicle interior.

On the other hand, the gas injection device 70 may be selectively operated in the dehumidification mode of the vehicle.

First, when the gas injection device 70 does not operate, the second expansion valve 74 may expand the refrigerant supplied from the internal condenser 52a through the supply unit 72 to be supplied to the heat-exchanger 53.

Accordingly, the heat-exchanger 53 may evaporate the refrigerant through heat-exchange with the coolant.

Conversely, when the gas injection device 70 is operated, the first expansion valve 73 may expand the refrigerant supplied from the internal condenser 52a through the supply unit 72 to be supplied to the gas-liquid separator 71.

Among the refrigerant supplied to the gas-liquid separator 71, the refrigerant in a gas state is supplied to the compressor 59 through the open supply line 75.

That is, the gas injection device 70 may increase the flow rate of the refrigerant circulating through the refrigerant line 51 by inflowing the refrigerant in the gas state separated while passing through the gas-liquid separator 71 to the compressor 59 through the supply line 75 again.

Also, the liquid refrigerant stored in the gas-liquid separator 71 may flow into the heat-exchanger 53 along the refrigerant line 51 opened through the operation of the second expansion valve 74.

At this time, the second expansion valve 74 expands the refrigerant supplied from the gas-liquid separator 71.

Accordingly, the heat-exchanger 53 may evaporate the refrigerant through heat-exchange with the coolant.

That is, in the gas injection device 70, the gas-liquid separator 71 may supply the gas refrigerant to the compressor 59 through the supply line 75 and supply the liquid refrigerant to the second expansion valve 74.

Then, the refrigerant may be expanded while passing through the second expansion valve 74 and may be evaporated through heat-exchange with the coolant in the heat-exchanger 53.

Also, among the refrigerant that has been expanded while passing through the second expansion valve 74, some refrigerant is supplied to the evaporator 56 along the opened third branched line 66 and the dehumidification line 68.

Accordingly, the outside air inflowed to the HVAC module 52 is dehumidified while passing through the evaporator 56 by the refrigerant in a low temperature state inflowed to the evaporator 56. Then, it is converted to a high temperature state while passing through the internal condenser 52a and inflows into the vehicle interior, thereby smoothly heating and dehumidifying the vehicle interior.

Therefore, as described above, according to the heat pump system for the vehicle according to embodiments of the present invention, by controlling the temperature of the battery module 33 according to the mode of the vehicle by using one chiller 40 in which the coolant and the refrigerant are heat-exchanged, the entire system may be simplified.

In addition, embodiments of the present invention may operate the battery module 33 in an optimum performance state by efficiently controlling the temperature of the battery module 33, and the total traveling distance of the vehicle may be increased through the efficient management of the battery module 33.

In addition, embodiments of the present invention may improve heating efficiency by selectively using the heat from an external heat source or the waste heat of the electrical component 23 in the heating mode of the vehicle.

In addition, embodiments of the present invention may maximize heating performance by selectively increasing the flow rate of refrigerant in the heating mode by applying the gas injection device 70.

Furthermore, embodiments of the present invention may reduce the manufacturing cost and weight through simplification of the entire system and may improve space utilization.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A heat pump system for a vehicle, the heat pump system comprising:
   a cooling apparatus comprising a radiator and a multi-way valve connected by a first coolant line, the cooling apparatus being configured to circulate a coolant in the first coolant line;
   a second coolant line comprising a first end and a second end connected to the multi-way valve, the second coolant line being equipped with a first water pump and an electrical component;
   a third coolant line comprising a first end and a second end connected to the multi-way valve, the third coolant line being equipped with a second water pump and a battery module;
   a chiller provided on the third coolant line, connected to a refrigerant line of an air conditioner device through a refrigerant connection line, and configured to adjust a temperature of the coolant circulated in the third coolant line by heat-exchanging the coolant selectively inflowing through the third coolant line with a refrigerant selectively supplied from the air conditioner device; and
   a gas injection device configured to selectively expand the refrigerant supplied from an internal condenser included in the air conditioner device to be supplied to a heat-exchanger connected to the second coolant line and to selectively supply some of the refrigerant supplied from the internal condenser to a compressor to increase a flow rate of the refrigerant circulating in the refrigerant line, wherein the gas injection device comprises:
a gas-liquid separator configured to separate the refrigerant inflowing inside into a gas refrigerant and a liquid refrigerant to be selectively exhausted;
a supply unit connected to the internal condenser through the refrigerant line so that the refrigerant supplied from the internal condenser inflows;
a first expansion valve provided between the gas-liquid separator and the supply unit and configured to selectively expand the refrigerant supplied to the supply unit to be supplied to the gas-liquid separator;
a second expansion valve configured to selectively expand the refrigerant supplied to the supply unit to be supplied to the heat-exchanger and provided between the gas-liquid separator and the supply unit so as to supply the refrigerant supplied from the gas-liquid separator to be supplied to the heat-exchanger; and
a supply line connecting the gas-liquid separator and the compressor and configured to selectively supply the refrigerant in a gas state from the gas-liquid separator to the compressor.

2. The heat pump system of claim 1, wherein the air conditioner device comprises:
an HVAC module comprising an evaporator connected through the refrigerant line and an opening/closing door configured to control outside air passing through the evaporator to selectively inflow to the internal condenser according to a cooling mode, a heating mode, a dehumidification mode, or a heating and dehumidification mode of the vehicle;
the compressor connected via the refrigerant line between the evaporator and the internal condenser,
a sub-condenser provided in the refrigerant line between the heat-exchanger and the evaporator;
a third expansion valve provided in the refrigerant line between the sub-condenser and the evaporator;
a fourth expansion valve provided in the refrigerant connection line; and
an accumulator provided in the refrigerant line between the evaporator and the compressor and connected to the refrigerant connection line.

3. The heat pump system of claim 2, wherein:
when the gas injection device is operated in the heating mode of the vehicle, the first expansion valve is configured to expand the refrigerant supplied through the supply unit from the internal condenser to be supplied to the gas-liquid separator;
the second expansion valve is configured to expand the refrigerant supplied from the gas-liquid separator to flow to the refrigerant line;
the supply line is opened; and
the gas-liquid separator is configured to supply the refrigerant in the gas state to the compressor through the open supply line among the refrigerant inflowed inside.

4. The heat pump system of claim 2, wherein:
when the gas injection device does not operate in the heating mode of the vehicle, an operation of the first expansion valve is stopped;
inflow of the refrigerant to the gas-liquid separator is blocked; and
the second expansion valve is configured to expand the refrigerant supplied from the internal condenser through the supply unit to be supplied to the heat-exchanger.

5. The heat pump system of claim 2, wherein:
in a case of the cooling mode or the dehumidification mode of the vehicle, in the gas injection device, an operation of the first expansion valve is stopped;
the second expansion valve is configured to flow the refrigerant supplied from the internal condenser through the supply unit through the refrigerant line without expansion; and
inflow of the refrigerant to the gas-liquid separator is blocked.

6. The heat pump system of claim 2, wherein the heat-exchanger is configured to additionally condense or evaporate the refrigerant condensed in the internal condenser through heat-exchange with the coolant according to a selective operation of the gas injection device.

7. The heat pump system of claim 2, wherein the fourth expansion valve, when cooling the battery module by using the coolant heat-exchanged with the refrigerant, is configured to expand the refrigerant inflowing through the refrigerant connection line to inflow to the chiller.

8. The heat pump system of claim 2, wherein the air conditioner device further comprises:
a first branched line comprising a first end connected to the fourth expansion valve and a second end connected to the refrigerant line provided between the evaporator and the accumulator;
a second branched line configured to directly inflow the refrigerant exhausted from the heat-exchanger to the accumulator through an operation of a refrigerant valve provided on the refrigerant line between the heat-exchanger and the sub-condenser;
a third branched line comprising a first end connected to the refrigerant line between the heat-exchanger and the gas injection device and a second end connected to a control valve;
a dehumidification line comprising a first end connected to the control valve and a second end connected to the refrigerant line between the evaporator and the third expansion valve; and
a sub-supply line comprising a first end connected to the control valve and a second end connected to the refrigerant line between the heat-exchanger and the sub-condenser.

9. The heat pump system of claim 8, wherein:
the first branched line is configured to be selectively opened and closed through an operation of the fourth expansion valve in the heating mode of the vehicle;
the second branched line is configured to be opened by the operation of the refrigerant valve in the heating mode of the vehicle;
the third branched line is configured to be selectively opened and closed through an operation of the control valve in the heating mode or the dehumidification mode of the vehicle;
the dehumidification line is configured to be opened through the operation of the control valve in the heating and dehumidification mode of the vehicle; and
the sub-supply line is configured to be selectively opened through the operation of the control valve in the heating mode of the vehicle.

10. The heat pump system of claim 8, wherein:
when cooling the battery module in the cooling mode, the first coolant line is connected to the second coolant line through an operation of the multi-way valve;
the coolant cooled by the radiator circulates through the electrical component while flowing along the first coolant line and the second coolant line through an operation of the first water pump;

the third coolant line defines a closed and sealed circuit independent from the first coolant line and the second coolant line through the operation of the multi-way valve;

the coolant that has passed through the chiller is supplied to the battery module through an operation of the second water pump in the third coolant line; and in the air conditioner device, in a state that the first branched line is closed and the refrigerant connection line is opened through an operation of the fourth expansion valve, the refrigerant circulates along the refrigerant line and the refrigerant connection line;

the third and fourth expansion valves are configured to expand the refrigerant so that the expanded refrigerant is supplied to the evaporator and the chiller, respectively;

the second branched line is closed through the operation of the refrigerant valve;

the third branched line, the sub-supply line, and the dehumidification line are closed through an operation of the control valve; and in the gas injection device, the second expansion valve is configured to supply the refrigerant supplied from the internal condenser to the heat-exchanger without expanding.

11. The heat pump system of claim 10, wherein:
in the cooling apparatus, the coolant cooled by the radiator is supplied to the heat-exchanger along the first coolant line and the second coolant line through the operation of the first water pump;

in a state that a first end and a second end of the third coolant line are interconnected through the multi-way valve, the coolant continually circulates while sequentially passing through the battery module and the chiller along the third coolant line through the operation of the second water pump; and the heat-exchanger is configured to condense the refrigerant through heat-exchange with the coolant.

12. The heat pump system of claim 8, wherein:
when recovering heat from an external heat source and waste heat of the electrical component in the heating mode of the vehicle, the first coolant line is connected to the second coolant line through an operation of the multi-way valve;

the coolant cooled by the radiator circulates through the electrical component while flowing along the first coolant line and the second coolant line through an operation of the first water pump;

the third coolant line is closed through the operation of the multi-way valve;

in the air conditioner device, a portion of the refrigerant line that connects the sub-condenser and the evaporator is closed through an operation of the third expansion valve;

the first branched line is opened through an operation of the fourth expansion valve;

in a state where a first portion of the refrigerant connection line is opened through the operation of the fourth expansion valve so that the refrigerant line connected to the sub-condenser is connected to the refrigerant connection line, a second portion of the refrigerant connection line connected to the chiller is closed based on the fourth expansion valve;

the second branched line is opened through the operation of the refrigerant valve;

the third branched line and the sub-supply line are opened through an operation of the control valve;

the refrigerant that inflows into the sub-supply line is supplied along the refrigerant line to the sub-condenser, in the gas injection device, an operation of the first expansion valve and the gas-liquid separator is stopped;

the second expansion valve is configured to expand the refrigerant supplied from the internal condenser to be supplied to the heat-exchanger connected through the refrigerant line; and the heat-exchanger is configured to recover the heat from the external heat source and the waste heat of the electrical component while evaporating the refrigerant supplied through the second expansion valve through heat-exchange with the coolant recovering the heat from the external heat source and having the temperature increased while cooling the electrical component.

13. The heat pump system of claim 8, wherein:
when the gas injection device operates while recovering heat from an external heat source and waste heat of the electrical component in the heating mode of the vehicle, the first coolant line is connected to the second coolant line through an operation of the multi-way valve;

the coolant cooled by the radiator circulates through the electrical component while flowing along the first coolant line and the second coolant line through an operation of the first water pump;

the third coolant line is closed through the operation of the multi-way valve;

in the air conditioner device, a portion of the refrigerant line connecting the sub-condenser and the evaporator is closed through an operation of the third expansion valve;

in a state where a first portion of the refrigerant connection line is opened through an operation of the fourth expansion valve so that the refrigerant line connected to the sub-condenser is connected to the refrigerant connection line, a second portion of the refrigerant connection line connected to the chiller is closed based on the fourth expansion valve;

the second branched line is opened through the operation of the refrigerant valve;

the third branched line and the sub-supply line are opened through an operation of the control valve;

the refrigerant that inflows into the sub-supply line is supplied along the refrigerant line to the sub-condenser, in the gas injection device, the first expansion valve is configured to expand the refrigerant supplied from the supply unit to be supplied to the gas-liquid separator;

the gas-liquid separator is configured to supply the refrigerant in the gas state to the compressor through the opened supply line among the refrigerant supplied from the first expansion valve;

the second expansion valve is configured to additionally expand the refrigerant supplied from the gas-liquid separator to be supplied to the heat-exchanger connected through the refrigerant line; and the heat-exchanger is configured to recover the heat from the external heat source and the waste heat of the electrical component while evaporating the refrigerant supplied through the second expansion valve through heat-exchange with the coolant recovering the heat from the external heat source and having the temperature increased while cooling the electrical component.

14. The heat pump system of claim 8, wherein:
when the gas injection device operates while recovering waste heat of the electrical component in the heating mode of the vehicle, the first coolant line and the third coolant line are closed through an operation of the multi-way valve;
the first end and the second end of the second coolant line are interconnected through the operation of the multi-way valve so that the second coolant line defines an independent closed and sealed circuit;
in the second coolant line, the coolant that has passed through the electrical component continues to circulate through an operation of the first water pump;
in the air conditioner device, the refrigerant line connecting the sub-condenser and the evaporator is closed through an operation of the third expansion valve;
the refrigerant connection line and the first branched line are closed through an operation of the fourth expansion valve;
the second branched line is opened through the operation of the refrigerant valve;
the third branched line, the sub-supply line, and the dehumidification line are closed through an operation of the control valve;
in the gas injection device, the first expansion valve is configured to expand the refrigerant supplied from the supply unit to be supplied to the gas-liquid separator;
the gas-liquid separator is configured to supply the refrigerant in the gas state to the compressor through the opened supply line among the refrigerant supplied from the first expansion valve;
the second expansion valve is configured to additionally expand the refrigerant supplied from the gas-liquid separator to be supplied to the heat-exchanger connected through the refrigerant line; and
the heat-exchanger is configured to recover the waste heat of the electrical component while evaporating the refrigerant supplied through the second expansion valve through heat-exchange with the coolant whose temperature has risen while cooling the electrical component.

15. The heat pump system of claim 8, wherein:
in a case of the heating and dehumidification mode of the vehicle, the first coolant line is connected to the second coolant line through an operation of the multi-way valve;
the coolant cooled by the radiator circulates through the electrical component while flowing along the first coolant line and the second coolant line through an operation of the first water pump;
the third coolant line is closed through the operation of the multi-way valve;
in the air conditioner device, the refrigerant line connecting the sub-condenser and the evaporator is closed through an operation of the third expansion valve;
the refrigerant connection line and the first branched line are closed through an operation of the fourth expansion valve;
the second branched line is opened through the operation of the refrigerant valve;
the third branched line and the dehumidification line are opened through an operation of the control valve;
the sub-supply line is closed through the operation of the control valve;
in the gas injection device, an operation of the first expansion valve and the gas-liquid separator is stopped;
the second expansion valve is configured to expand the refrigerant supplied from the internal condenser to be supplied to the heat-exchanger connected through the refrigerant line;
the heat-exchanger is configured to recover heat from an external heat source and waste heat of the electrical component while evaporating the refrigerant supplied through the second expansion valve through heat-exchange with the coolant recovering the heat from the external heat source and having the temperature increased while cooling the electrical component; and
the dehumidification line is configured to supply some refrigerant from the refrigerant expanded through an operation of the second expansion valve to the evaporator.

16. The heat pump system of claim 8, wherein:
when cooling the electrical component and the battery module by using the coolant, the first coolant line is connected to the first end of the third coolant line through an operation of the multi-way valve;
the second end of the third coolant line is connected to the first end of the second coolant line through the operation of the multi-way valve;
the second end of the second coolant line is connected to the first coolant line through the operation of the multi-way valve;
the coolant cooled by the radiator is supplied to the battery module along the third coolant line from the multi-way valve through an operation of the second water pump;
the coolant that has passed the battery module inflows back to the multi-way valve along the third coolant line, and then is supplied to the electrical component along the second coolant line through an operation of the first water pump;
the coolant that has passed through the electrical component flows into the multi-way valve along the second coolant line, and then is supplied to the radiator along the first coolant line; and
an operation of the air conditioner device and the gas injection device is stopped.

17. The heat pump system of claim 16, wherein the first coolant line, the second coolant line, and the third coolant line are interconnected by the operation of the multi-way valve to define one connected circuit in which the coolant cooled by the radiator circulates.

18. The heat pump system of claim 2, wherein:
the first expansion valve is configured to selectively expand the refrigerant while controlling a flow of the refrigerant and comprises a 2-way electronic expansion valve with one inlet and one outlet; and
the second expansion valve and the fourth expansion valve are configured to selectively expand the refrigerant while controlling the flow of the refrigerant and the second expansion valve and the fourth expansion valve each comprise a 3-way electronic expansion valve with two inlets and one outlet.

19. The heat pump system of claim 1, wherein:
the first water pump is mounted on the multi-way valve to which the second coolant line is connected; and
the second water pump is mounted on the multi-way valve to which the third coolant line is connected.

20. The heat pump system of claim 1, wherein the multi-way valve is equipped with a reservoir tank that is integrally mounted.

* * * * *